US012618405B2

(12) United States Patent
King

(10) Patent No.: US 12,618,405 B2
(45) Date of Patent: May 5, 2026

(54) SUMP FILTER W/ C.O.D

(71) Applicant: Conner J King, Loveland, CO (US)

(72) Inventor: Conner J King, Loveland, CO (US)

( * ) Notice: Subject to any disclaimer, the term of this patent is extended or adjusted under 35 U.S.C. 154(b) by 454 days.

(21) Appl. No.: 18/470,870

(22) Filed: Sep. 20, 2023

(65) Prior Publication Data

US 2025/0092871 A1       Mar. 20, 2025

(51) Int. Cl.
*F04B 53/20*        (2006.01)
*C02F 3/20*         (2023.01)

(52) U.S. Cl.
CPC ................ F04B 53/20 (2013.01); C02F 3/20 (2013.01)

(58) Field of Classification Search
CPC .... F04B 53/20; C02F 3/20; C02F 3/04; C02F 3/06
See application file for complete search history.

(56) References Cited

U.S. PATENT DOCUMENTS 5,628,905 A * 5/1997 Montalbano ......... A01K 63/045
210/615

* cited by examiner

*Primary Examiner* — Waqaas Ali

(57) ABSTRACT

A B.A.W.P.S. multi tower sump filter w/ c.o.d. and bioskimmer is formed of glass, plastic, acrylic, or other semi-translucent material. It includes a system of filtration that will render any aquatic environment "cycleless" and has connections for internal plumbing as well as compressed oxygen diffusion or "c.o.d.", wet/dry biologic bacteria generation and storage, lighting, protein bioskimmer filter, wet/dry trickle biologic filter, sponge prefilter, carbon prefilter, dosing system, in-sump top surface skimming, in-sump vac pipe top water skimming with skimbob, water top-off and fill feeding port with separate submerged food, water, additive and/or water treatment release port, manual or electronic feeding system, flow control manifold power-head/(s), thermostatic system control interface, diodes, probes and sensors. The unit can stand freely on its own, or stand on its own in a separate tank. Use includes the transfer of system water be it fresh, brackish or salt, from any habitat containment chamber or area and into the filter unit for processing, and then the return of the newly treated and processed water back into the main habitat containment chamber again.

9 Claims, 36 Drawing Sheets

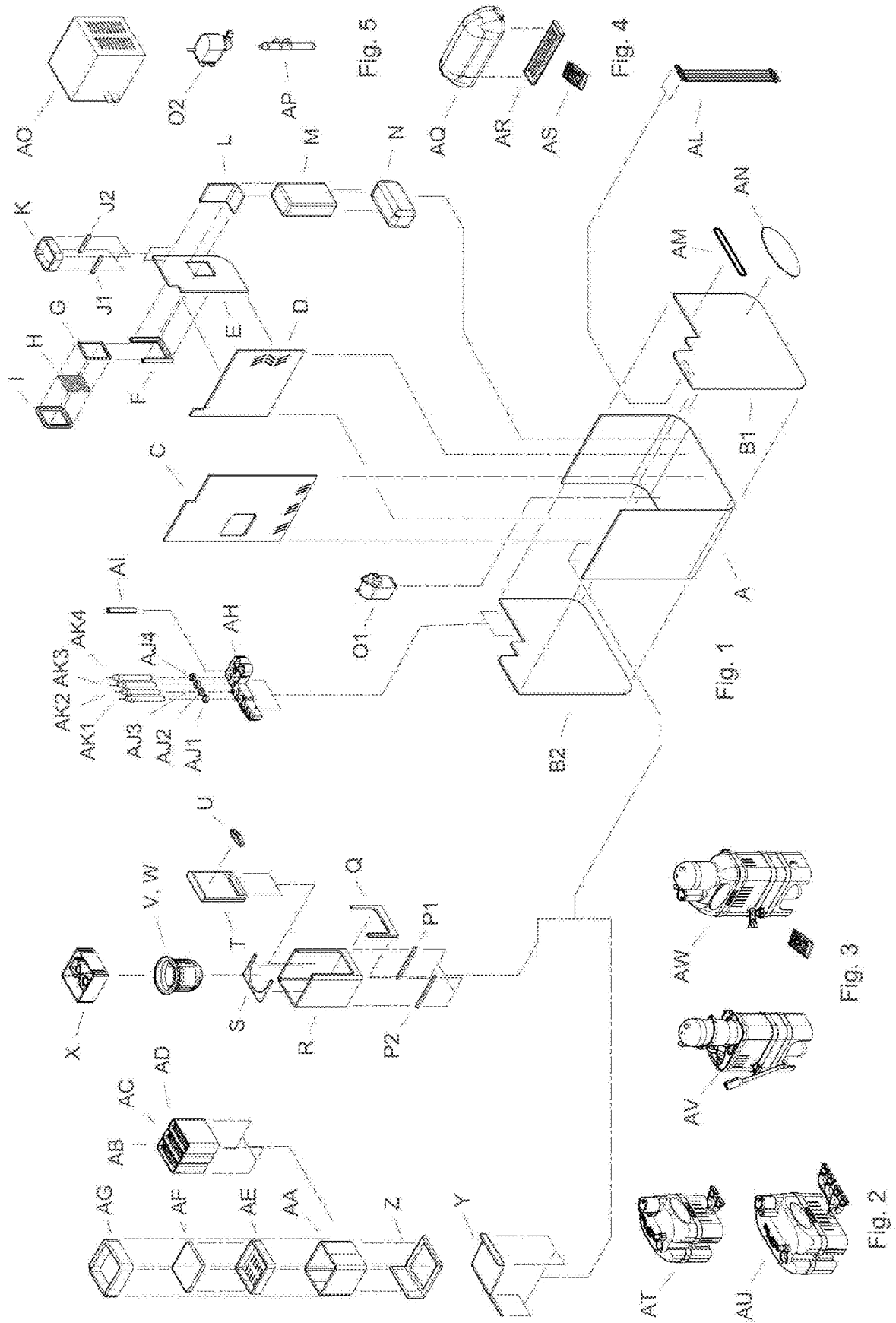

| ITEM | DESCRIPTION | QNTY | PAGE |
|---|---|---|---|
| | ISOMETRIC EXPLODED ASSEMBLY VIEW | - | BP900-001 |
| - | FRONT AND LEFT SIDE ASSEMBLY VIEW | - | BP900-002 |
| - | BACK AND RIGHT SIDE ASSEMBLY VIEW | - | BP900-003 |
| - | TOP AND BOTTOM ASSEMBLY VIEW | - | BP900-004 |
| A | EXTERIOR PANEL BOTTOM | 1 | BP900-005 |
| B1 | EXTERIOR PANEL FRONT | 2 | BP900-006 |
| B2 | EXTERIOR PANEL BACK | - | BP900-006 |
| C | INTERIOR PANEL, REFUGIUM SEPARATION | 1 | BP900-007 |
| D | INTERIOR PANEL, PUMP CHAMBER SEPARATION | 1 | BP900-008 |
| E | INTERIOR PANEL, BANK FILTER PUMP CHAMBER SEPARATION | 1 | BP900-009 |
| F | BANK FILTER SLIDE FRAME | 1 | BP900-010 |
| G | BANK FILTER SLIDE FRAME PLATE (OPTIONAL) | 1 | BP900-011 |
| H | BANK FILTER SLIDE FRAME PRE-FILTER SCREEN (OPTIONAL) | 1 | BP900-012 |
| I | BANK FILTER SLIDE FRAME PRE-FILTER SCREEN LOCK PLATE (OPTIONAL) | 1 | BP900-013 |
| J1 | AUXILIARY FOOD STORAGE TRAY RIGHT SUPPORT RGL | 2 | BP900-014 |
| J2 | AUXILIARY FOOD STORAGE TRAY LEFT SUPPORT RAIL | - | BP900-014 |
| K | AUXILIARY FOOD STORAGE TRAY (OPTIONAL) | 1 | BP900-015 |
| L | INTERIOR PANEL FOOD STORAGE TRAY BRIDGE | 1 | BP900-016 |
| M | MUD BANK MEDIA PRE-FILTER SPONGE (OPTIONAL) | 1 | BP900-017 |
| N | MUD BANK MEDIA PRE-FILTER MICRON MESH W/ MUD MEDIA (OPTIONAL) | 1 | BP900-018 |
| O1 | SYSTEM PUMP TYPE 1 (OPTIONAL) | 1 | BP900-019 |
| O2 | SYSTEM PUMP TYPE 2 (OPTIONAL) | - | BP900-019 |
| P1 | SOCK TOWER FRAME RIGHT SUPPORT RAIL | 2 | BP900-020 |
| P2 | SOCK TOWER FRAME LEFT SUPPORT RAIL | - | BP900-020 |
| Q | SOCK TOWER FRAME FRONT STOP | 1 | BP900-021 |
| R | SOCK TOWER FRAME | 1 | BP900-022 |
| S | SOCK TOWER FRAME SLIDE | 1 | BP900-023 |
| T | SOCK TOWER FRAME SLIDING DOOR | 1 | BP900-024 |
| U | SOCK TOWER FRAME SLIDING DOOR LOGO | 1 | BP900-025 |
| V | SOCK TOWER FRAME MICRON MESH PRE-FILTER SOCK RING | 1 | BP900-026 |
| W | SOCK TOWER FRAME MICRON MESH PRE-FILTER SOCK | 1 | BP900-026 |
| X | SOCK TOWER FRAME DRAIN TIE-IN BOX | 1 | BP900-027 |

| ITEM | DESCRIPTION | QNTY | PAGE |
|---|---|---|---|
| Y | BIO-MEDIA STORAGE DRAIN BOX CHUTE FLOW DOWN PLATE | 1 | BP900-028 |
| Z | BIO-MEDIA STORAGE DRAIN BOX SUPPORT PLATE | 1 | BP900-029 |
| AA | BIO-MEDIA STORAGE GENERATOR DRIP TRAY BOX (OPTIONAL) | 1 | BP900-030 |
| AB | BIO STACK 2 STAGE / 3-PHASE BACTERIA STORAGE GENERATOR-1 (OPTIONAL) | 1 | BP900-031 |
| AC | BIO STACK 2 STAGE / 3-PHASE BACTERIA STORAGE GENERATOR-2 (OPTIONAL) | 1 | BP900-031 |
| AD | BIO STACK 2 STAGE / 3-PHASE BACTERIA STORAGE GENERATOR-3 (OPTIONAL) | 1 | BP900-031 |
| AE | BIO-MEDIA STORAGE GENERATOR DRIP TRAY | 1 | BP900-032 |
| AF | BIO-MEDIA STORAGE GENERATOR DRIP TRAY PRE-FILTER SPONGE (OPTIONAL) | 1 | BP901-033 |
| AG | BIO-MEDIA STORAGE GENERATOR DRIP TRAY SPLASH GUARD LOCK PLATE | 1 | BP901-034 |
| AH | DPC DOSER, PROBE, CHILLER MANIFOLD / HARNESS (OPTIONAL) | 1 | BP900-035 |
| AI | DPC DOSER, PROBE, CHILLER MANIFOLD DROP PIPE (OPTIONAL) | 1 | BP900-036 |
| AJ1 | DPC DOSER, PROBE, CHILLER MANIFOLD PROBE INSULATOR 1 (OPTIONAL) | 4 | BP900-037 |
| AJ2 | DPC DOSER, PROBE, CHILLER MANIFOLD PROBE INSULATOR 2 (OPTIONAL) | - | BP900-037 |
| AJ3 | DPC DOSER, PROBE, CHILLER MANIFOLD PROBE INSULATOR 3 (OPTIONAL) | - | BP900-037 |
| AJ4 | DPC DOSER, PROBE, CHILLER MANIFOLD PROBE INSULATOR 4 (OPTIONAL) | - | BP900-037 |
| AK1 | DPC DOSER, PROBE, CHILLER MANIFOLD PROBE-1 - TEMPERATURE (OPTIONAL) | 1 | BP900-031 |
| AK2 | DPC DOSER, PROBE, CHILLER MANIFOLD PROBE-2 - CONDUCTIVITY (OPTIONAL) | 1 | BP900-038 |
| AK3 | DPC DOSER, PROBE, CHILLER MANIFOLD PROBE-3 - REDOX-ORP (OPTIONAL) | 1 | BP900-038 |
| AK4 | DPC DOSER, PROBE, CHILLER MANIFOLD PROBE-4 - AUX (OPTIONAL) | 1 | BP900-041 |
| AL | TCI - SYSTEM THERMOSTATIC CONTROL INTERFACE (OPTIONAL) | 1 | BP900-042 |
| AM | FRONT PANEL BIOTRAP MODEL - LOGO | 1 | BP900-043 |
| AN | FRONT PANEL SEAHORSE - LOGO | 1 | BP901-044 |
| AO | EXTERNAL CHILLER UNIT (OPTIONAL) | 1 | BP901-045 |
| AP | SYSTEM SUMP HEATER - 100 Watt (OPTIONAL) | 1 | BP901-046 |
| AQ | DAISY LED ARRAY LIGHT FIXTURE HOOD (OPTIONAL) | 1 | BP901-047 |
| AR | DAISY LED ARRAY LIGHT FIXTURE - 9250 White/Active Blue Spectrum (OPTIONAL) | 1 | BP901-048 |
| AS | DAISY LED ARRAY LIGHT FIXTURE REMOTE/CONTROL (OPTIONAL) | 1 | BP901-049 |
| AT | BILL OF MATERIAL - BOM | 1 | BP900-050 |
| AU | REF - P1200-OFB - BIOTRAP SEAHORSE MULTI-TOWER OVERFLOW BOX (OPTIONAL) | - | BP900-051 |
| AV | REF - P1280-OFB - BIOTRAP SEAHORSE MULTI-TOWER OVERFLOW BOX (OPTIONAL) | - | BP900-052 |
| AW | REF - P100-BTF - BioTrap Biological Trapping Filter w/ C.O.D. (OPTIONAL) | - | BP900-053 |
| AV | REF - P154-BTF - BioTrap Biological Trapping Filter w/ Light and C.O.D. (OPTIONAL) | - | BP900-054 |

Fig. 6

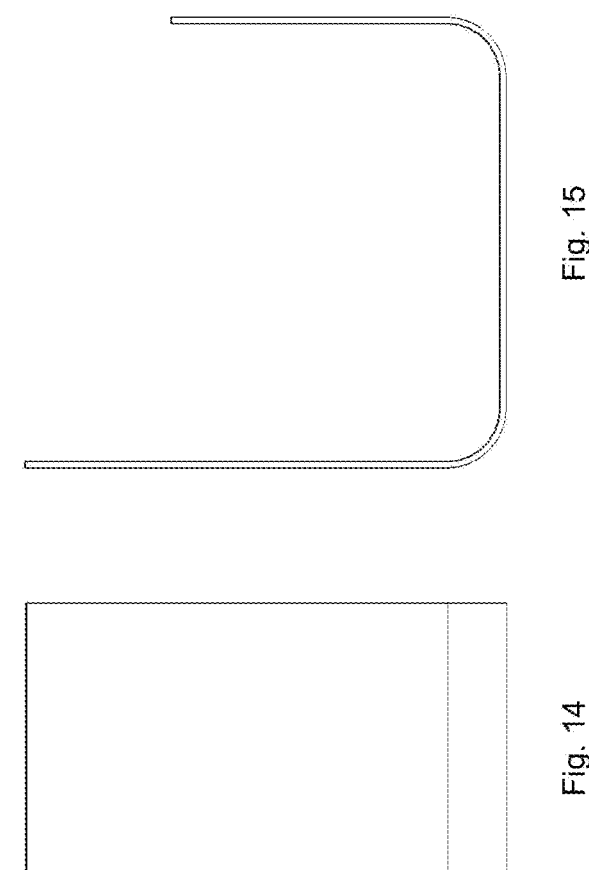
Fig. 15
Fig. 14
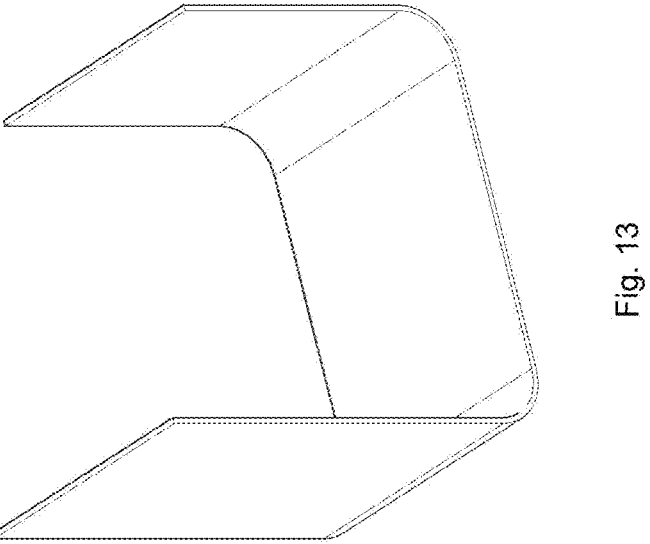
Fig. 13

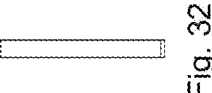
Fig. 32
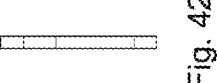
Fig. 42
Fig. 31
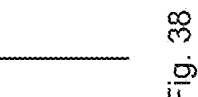
Fig. 35
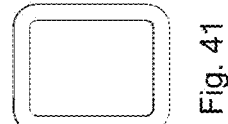
Fig. 38
Fig. 41
Fig. 30
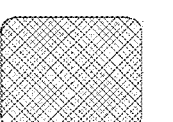
Fig. 34
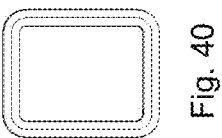
Fig. 37
Fig. 40
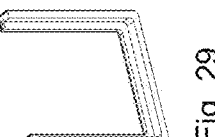
Fig. 29
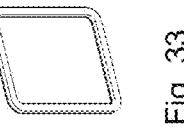
Fig. 33
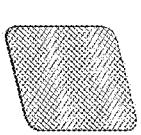
Fig. 36
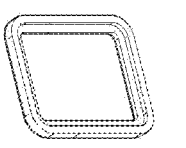
Fig. 39
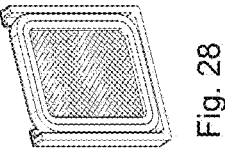
Fig. 28

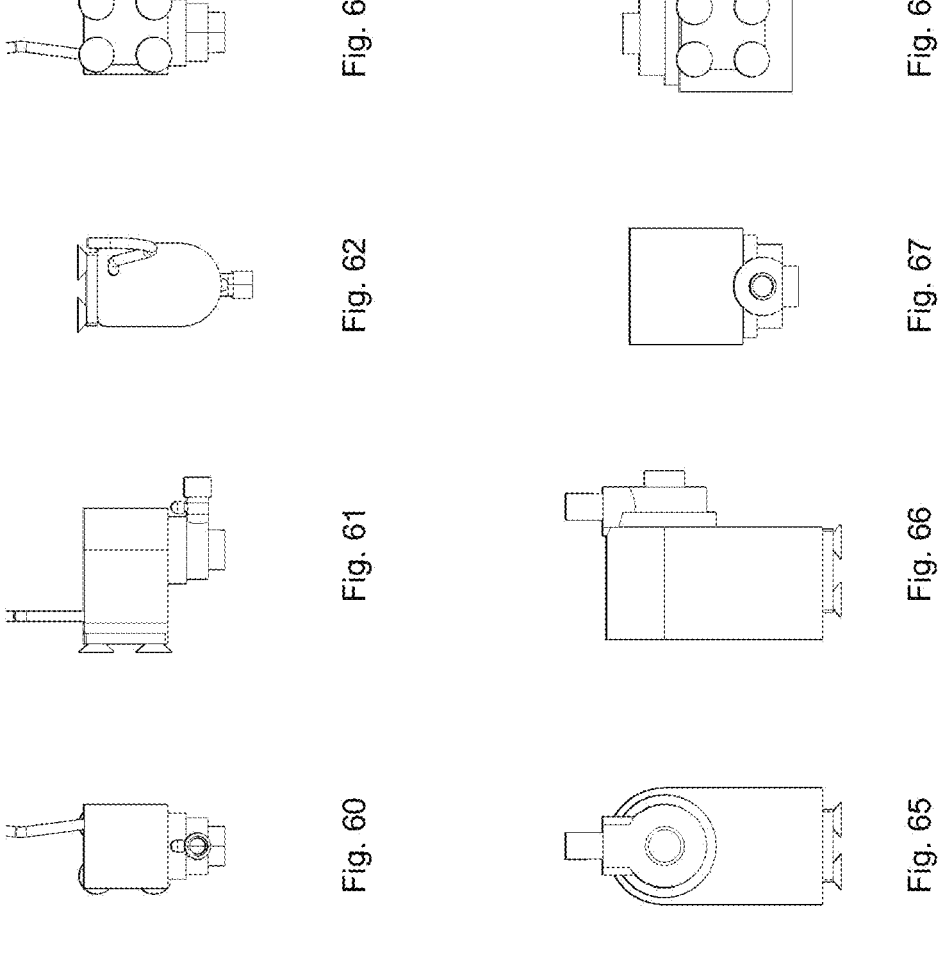
Fig. 63
Fig. 62
Fig. 61
Fig. 60
Fig. 68
Fig. 67
Fig. 66
Fig. 65
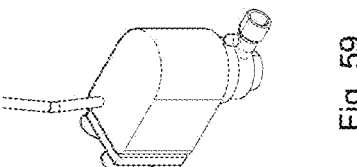
Fig. 59
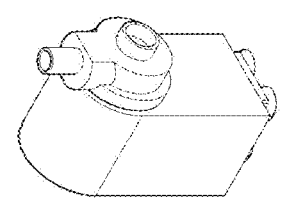
Fig. 64

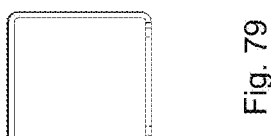
Fig. 79
Fig. 72
Fig. 75
Fig. 78
Fig. 82
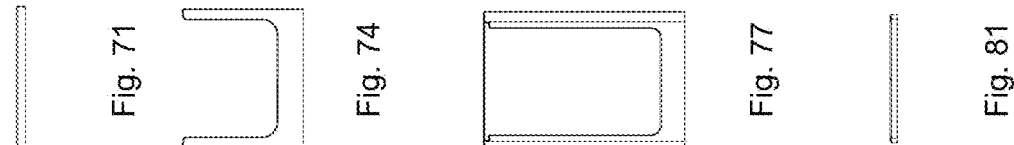
Fig. 71
Fig. 74
Fig. 77
Fig. 81
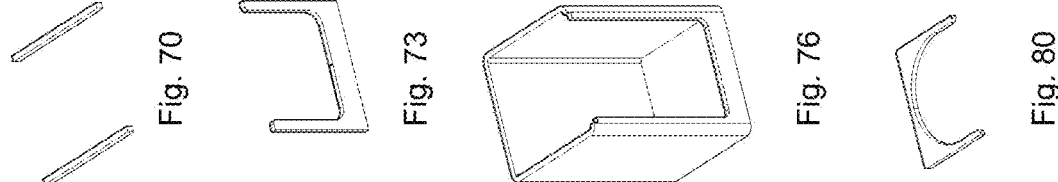
Fig. 70
Fig. 73
Fig. 76
Fig. 80
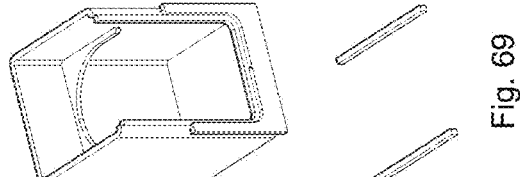
Fig. 69

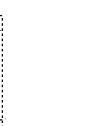
Fig. 87
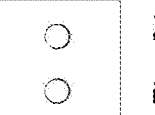
Fig. 91
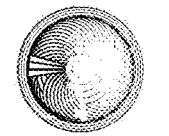
Fig. 95
Fig. 86
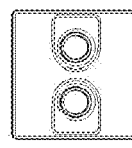
Fig. 90
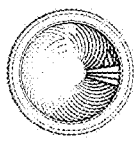
Fig. 94
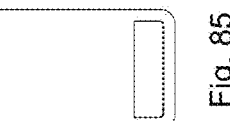
Fig. 85
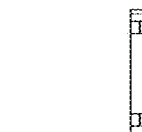
Fig. 89
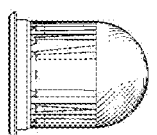
Fig. 93
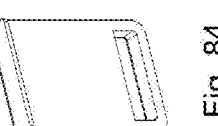
Fig. 84
Fig. 88
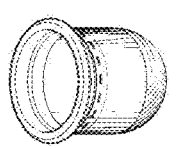
Fig. 92
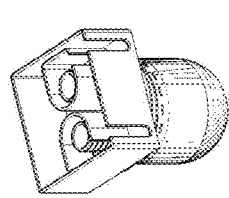
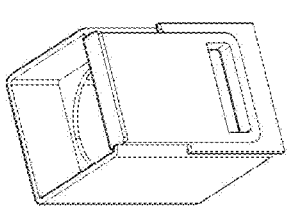
Fig. 83

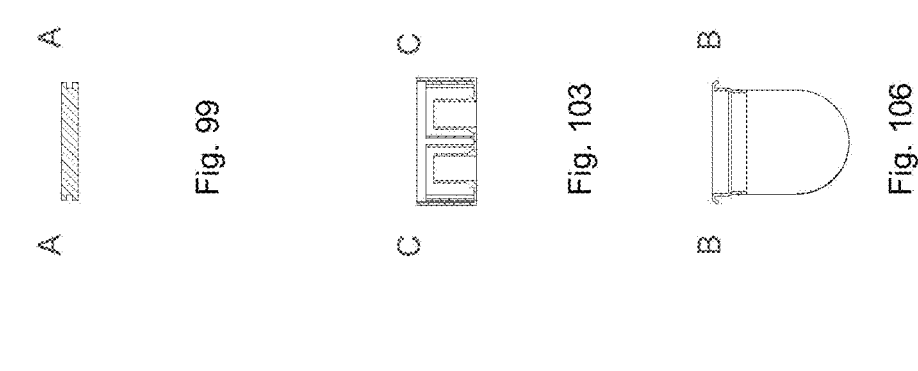
Fig. 99
Fig. 103
Fig. 106
Fig. 98
Fig. 102
Fig. 105
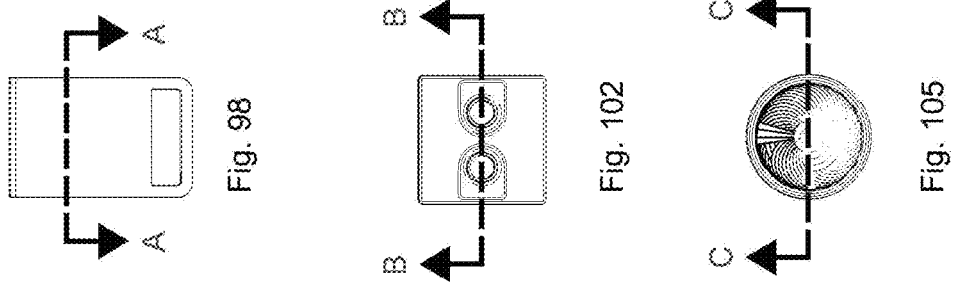
Fig. 97
Fig. 101
Fig. 104
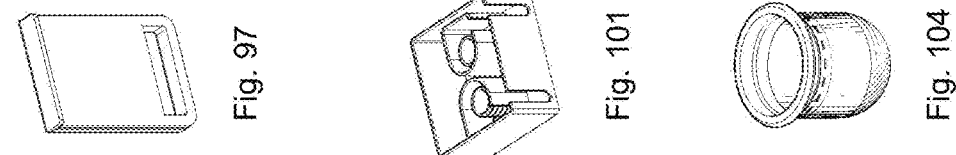
Fig. 96
Fig. 100

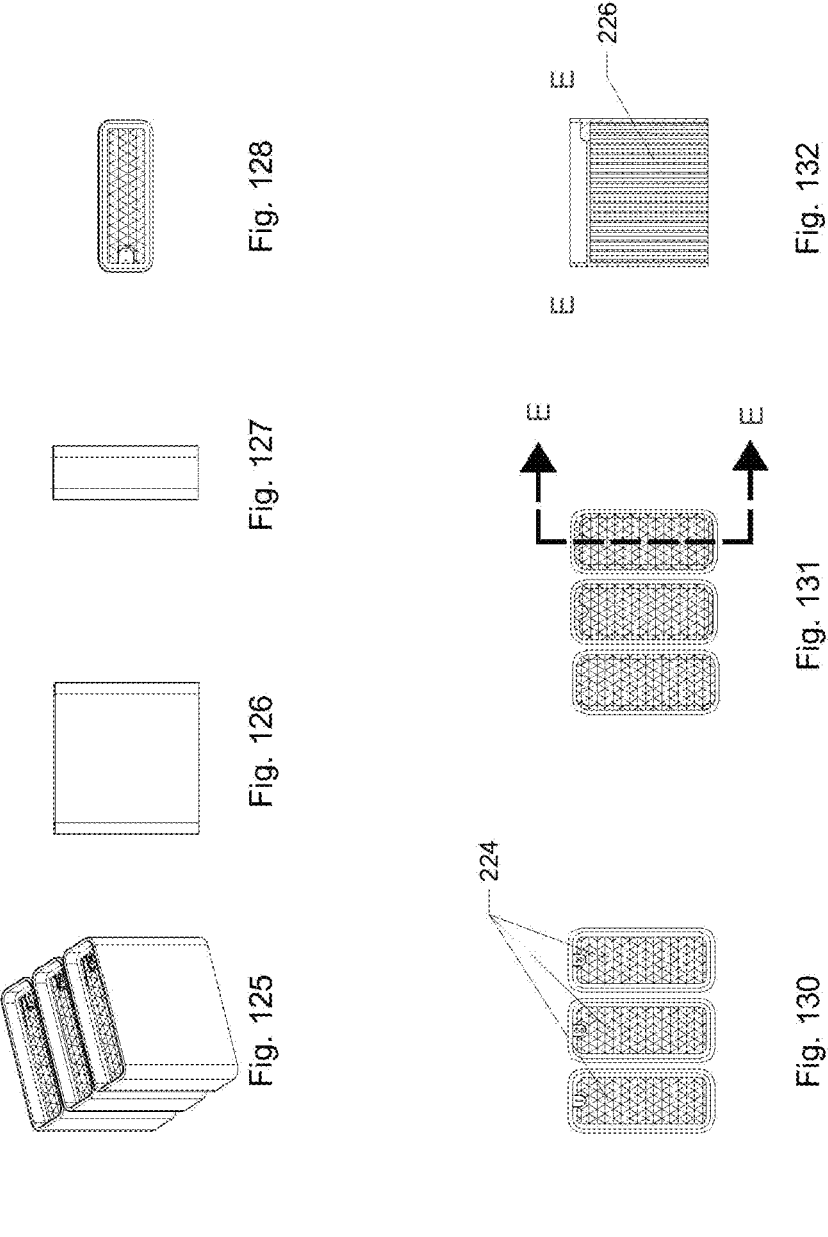
Fig. 128
Fig. 127
Fig. 126
Fig. 125
Fig. 132
Fig. 131
Fig. 130
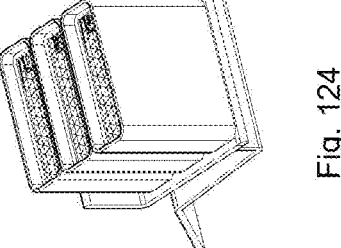
Fig. 124
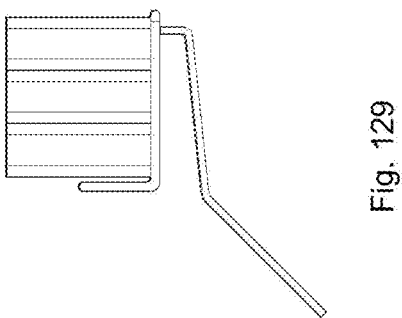
Fig. 129

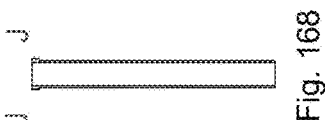
Fig. 168
Fig. 172
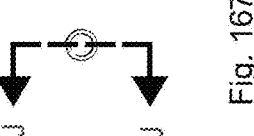
Fig. 167
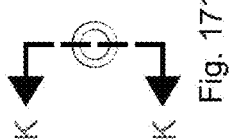
Fig. 171
Fig. 166
Fig. 170
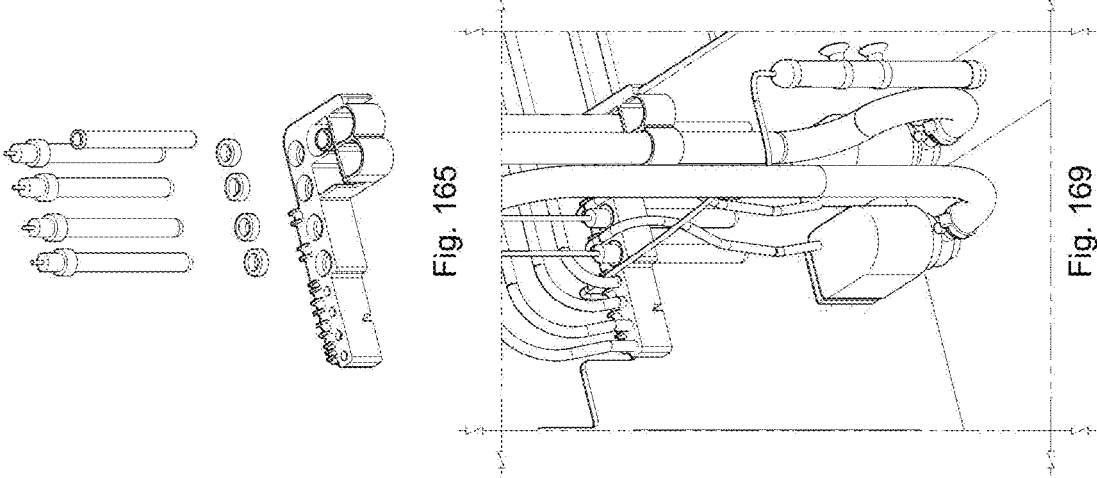
Fig. 165
Fig. 169

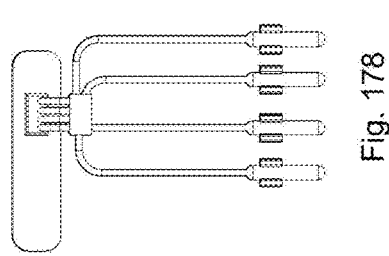
Fig. 178
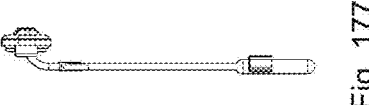
Fig. 177
Fig. 176
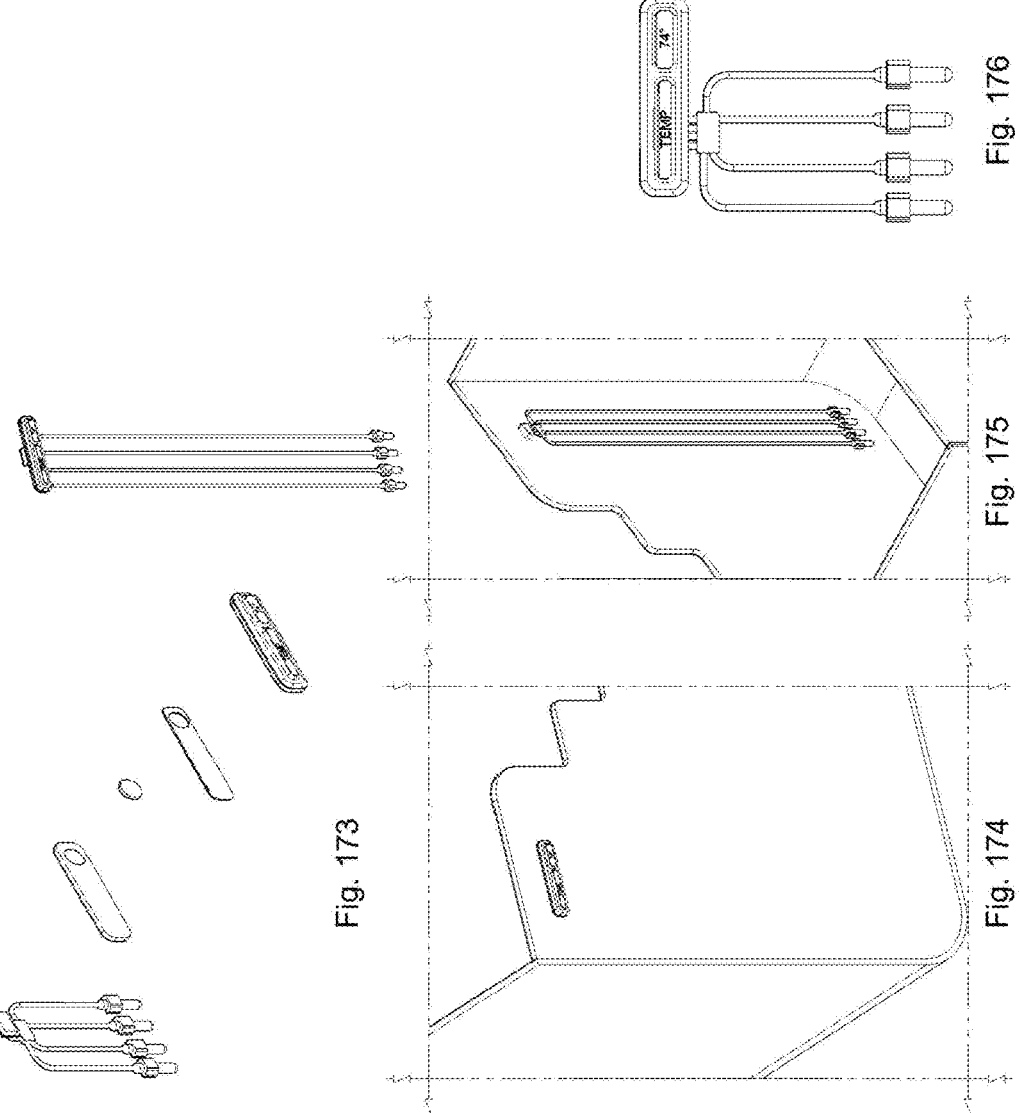
Fig. 175
Fig. 173
Fig. 174

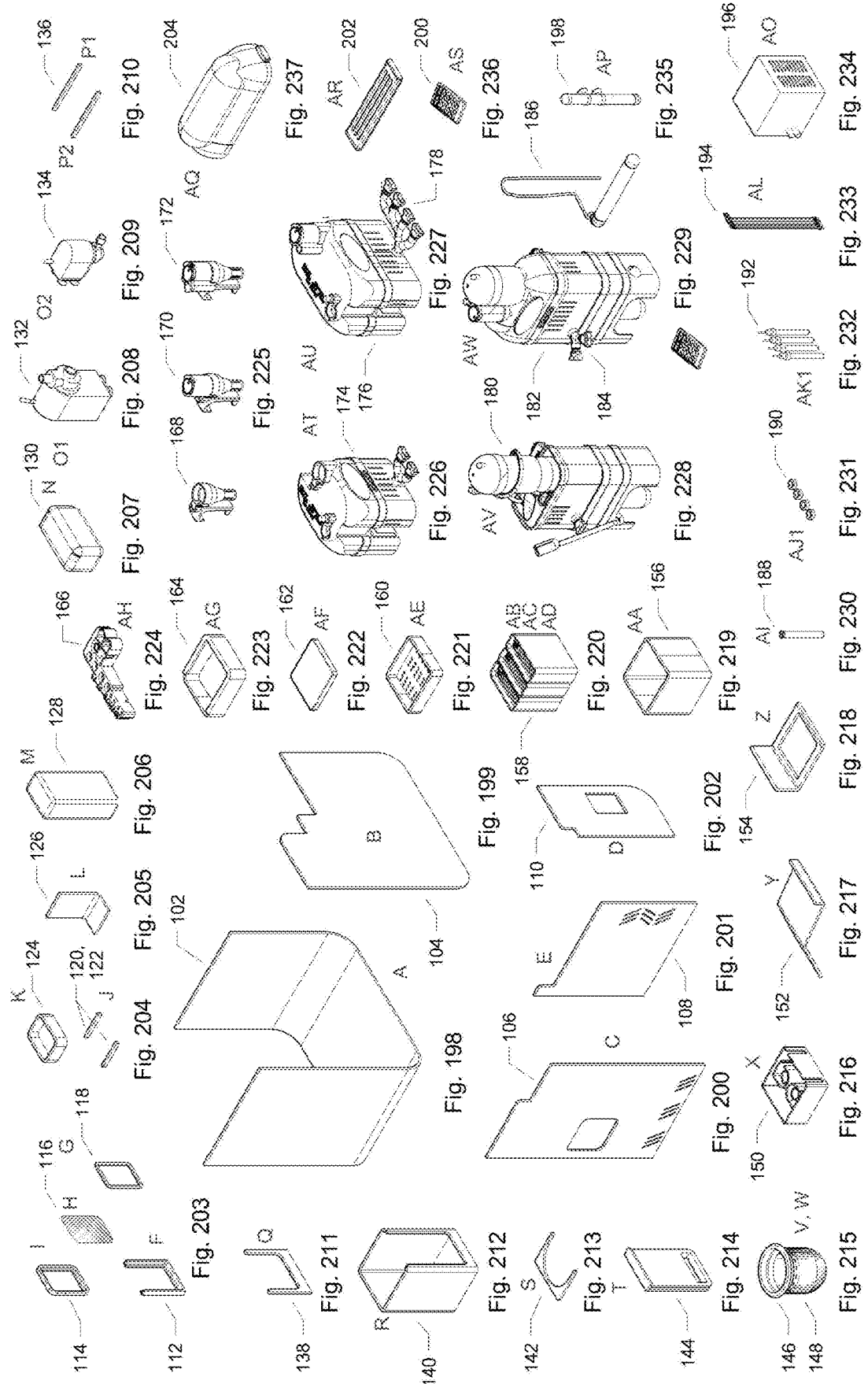

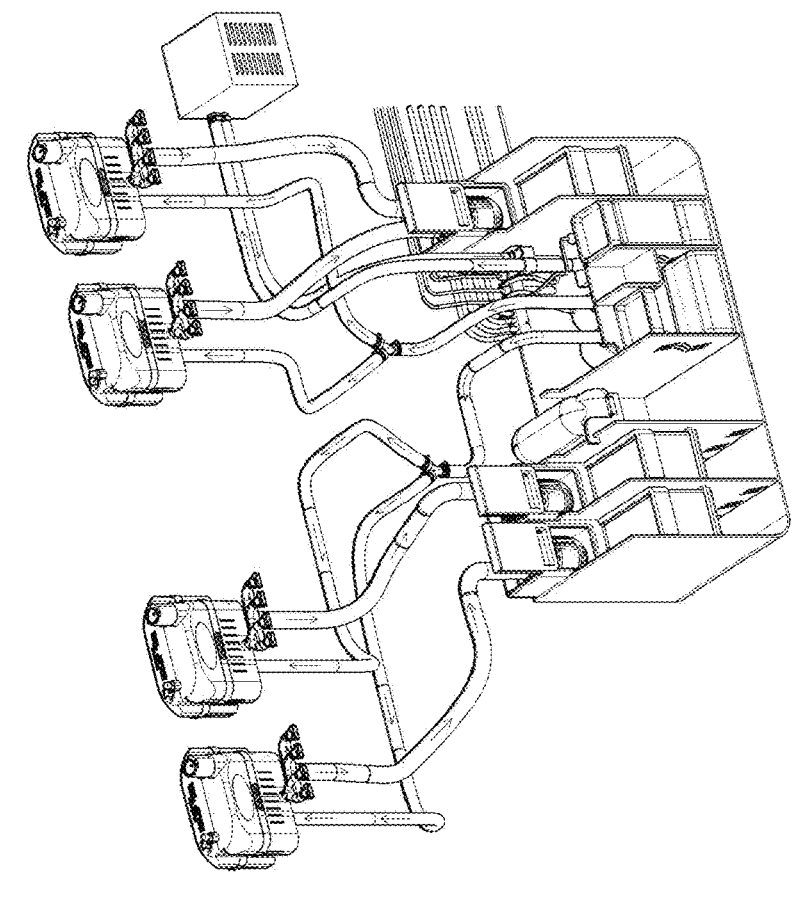
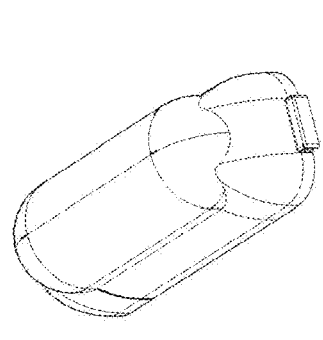
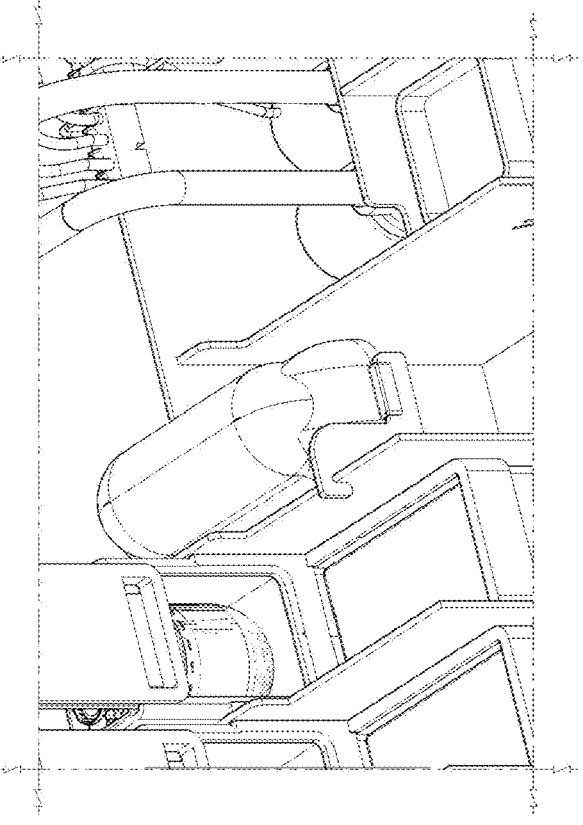
Fig. 247

SUMP FILTER W/ C.O.D

FIELD OF INVENTION

The present invention relates generally to a multi tower "biological aquatic water purification system" or (BAWPS) filter w/bioskimmer and c.o.d. which freely stands on its own and connects easily to any aquarium, tank, sump or pond externally, and is used to process and purify the unfiltered water of any external main tank/habitat chamber containment area, and when after filtering, returns the newly processed water back to the main tank/habitat chamber area once again. This circulating process continues uninterrupted.

BACKGROUND ART

There are various types of sump filters on the market today, most are complicated in nature and limited in functionality. Many, if not all of these filters provide little in the way of added features which can address the extended needs of most modern aquarists.

Some limitations of these filters include their inability to be expandable and fit in any system application when considering water volume and processing after initial installation, set up and priming.

At this point there does not exist the offered functionality for "compressed oxygen diffusion" or c.o.d. in any sump filter on the market. Compressed oxygen diffusion provides minute oxygen bubble introduction into any type of aquatic environment and makes the habitat chamber become part of the overall filtration system itself. By adding c.o.d. to the aquatic habitat chamber, the system becomes "cycleless" or spike free, a feature which has never been available before.

There is also traditionally the lack of any provided sump tower, or sump tower connection, for external tie-in to existing over flow box filters or other externals for water transfer and the removal of proteins, contaminants, and algae blooms from the main tank habitat chamber.

Most if not all of the current sump filters do not provide a high flow protein skimming feature or bioskimmer which removes contaminants such as ammonia, nitrate, nitrite and detritus build-up, as well as algae blooms from the aquatic system.

Few provide a method for the process of top surface water skimming let alone both top surface water skimming and low level water pull skimming separately or both at the same time during operation.

In addition, no current sump filters offer the ability to bypass the top surface skim slots of internal sump sub filters or chambers when applicable and spending time away from the system, an action which will cause the system pump to run dry and possibly overheat and threaten the safety of both the system and the tank inhabitants.

There is currently no provision granted by existing sump filters to address water level reduction due to the evaporation which takes place over time and when the operator is away or vacationing and cannot provide additional water to the system which results in supply water reduction, sump pump dry run, and overheating.

Seldom is there provided any biologic media, a trickle system, or the ability to cultivate, store or maintain cultured bacteria in a standard sump filter.

Rarely is a mud bank chamber provided for storing additional biologic media filter types, or the ability to cultivate, store or maintain other types of cultured bacteria in a standard sump filter.

The provision for an additive or chemical dosing system as well as a tie-in for an external chiller are not granted or addressed by most sump filter types.

Other disadvantages include a missing or inadequate method for the combined use of a sufficient sponge pre-filter which adds mechanical filtration, and/or a carbon media filter which adds chemical filtration upon initial startup of the filtration system.

The lack of sufficient technology to incorporate the use of a built in controller which would include a thermostat and set of diodes and probes, a combination which would provide the aquarist with pertinent real time information regarding the current state of the water quality that is present within the main tank/habitat chamber containment area during its normal operation and water processing.

There is very little consideration paid to address the organization of food container and tool storage, loose cables, cords and air lines, and the incorporation of a provided refugium chamber for plant filtering by most current sump filters.

Additionally, the use of an incorporated lighting system is virtually nonexistent on existing sump filter types.

Finally, there is the overall disadvantage that most sump filters have during normal operation which is that they are solely independent in design and construction and they do not participate or belong to any distinct family or complete system of like products which cover the full spectrum of internal and external water filtration, purification and processing, this alone rendering them of little use and nearly obsolete and most likely incompatible for inclusion when an aquarist who is constructing a new, or expanding on their existing filtration system while in the overall support of an aquatic environment.

BRIEF SUMMARY OF THE INVENTION

An aspect of the present invention is to provide a multi tower sump filter with c.o.d. and bioskimmer which is incredibly versatile and easy to install, set up, and use.

An aspect of the present invention is to provide a sump filter which can stand freely on its own and support an aquatic environment while processing water.

An aspect of the present invention is to provide a sub filter with c.o.d. and bioskimmer that allows for the generation and disbursement of compressed oxygen diffusion or c.o.d. into the main habitat chamber of the aquatic environment.

An aspect of the present invention is to provide a sump tower tie-in for the connection of multiple external over flow box filters which provide continuous directional supply flow within the main tank/habitat chamber containment area's upper water column.

An aspect of the present invention is to provide a sump tower tie-in for the connection of multiple external over flow box filters which provide surface skimming slots which continuously skim the main tank/habitat chamber containment area's upper water column and then transfer any contaminants which float up to the top surface or reside there, out of the main tank/habitat chamber containment area and back to the multi tower sump filter with c.o.d. via a sump tower, pipe, and over flow box filter configuration.

An aspect of the present invention is to provide an internal sump sub filter with protein skimming feature which removes contaminants such as ammonia, nitrate, nitrite and detritus build-up, as well as algae blooms from the system.

An aspect of the present invention is to provide a method for the processes of both top surface water skimming and low level water pull skimming simultaneously both within the multi tower sump filter with c.o.d.

An aspect of the present invention is to provide an optional vac pipe and external top water surface skimbob configuration conversion kit for the internal sump sub filter with c.o.d. which allows for the offset of the evaporation that takes place in the tank habitat chamber and prevents any sump surface water skimming from taking place, this often occurs when the system is left unattended during away time, (or vacationing); this eliminates the dry-run and overheating of the pump when the combined tank and sump water levels fall below that of the acceptable drain in-flow level of water flow at the surface water skimming intake slots of the over flow box filters and/or corner box drain configurations which causes the sump pump to run dry.

An aspect of the present invention is to provide a removable bio media containment wet/dry trickle sub filter assembly which allows for assorted media types to be kept in place in a wet/dry atmosphere during cultivation and storage of live bacteria cultures.

An aspect of the present invention is to provide a set of interchangeable biostacks with a large amount of internal surface area both submerged and exposed which can generate and store multiple types of living bacteria, and that can also be rinsed out periodically in a timed sequence to avoid bacteria overload and buildup on the specified substrate surface areas.

An aspect of the present invention is to provide a mud bank chamber with removable mud bank storage filter media which allows for assorted media types to be kept in place in a submerged or mud bed atmosphere during cultivation and storage of live bacteria, this adds biological filtration to the system.

An aspect of the present invention is to provide an internal sump bioskimmer which has a waste foam catch cup, float, and float level indicator for the removal of particulates and waist proteins, this adds mechanical filtration to the system.

An aspect of the present invention is to provide a harness or organizer for chemical dosing tubes, power cables, and airlines.

Another aspect of the present invention is to provide a method for the combined use of a sponge pre-filter which adds mechanical filtration to the system, and a carbon media pre-filter which adds chemical filtration to the system.

Another aspect of the present invention is to provide for the use of a flow control valve which (also allows for the connection of an additional external positive flow air-pump) and the injection manipulation of both the c.o.d. injection rate, and the simulated incoming tidal or slack tidal flowrate of water re-entering the sump filter.

Another aspect of the present invention is to provide a suitable mounting port on both the sub filter with c.o.d. and over flow box filters for the addition of an assortment of bi-directional and adjustable flow control manifolds as well as any other aftermarket powerhead assemblies which would assist with main sump refugium, tank/habitat chamber containment area circulations along with water return flow control.

Another aspect of the present invention is to provide an internal sump sub filter with c.o.d. and bioskimmer and an external over flow box filter combination with external top-off, water fill, additive, and food introduction ports which can be used for manually adding chemicals, additives and food to the system, or water to top-off the main tank/habitat chamber via the sump filter, or internal sump refugium containment areas after evaporation has taken place.

Another aspect of the present invention is to provide an independent top-off, water fill, additive, and slide soak feeder tank wall clip.

Another aspect of the present invention is to provide a manual soak feeder assembly or optional electronic soak feeder attachment for the application of submerged food release prior to feeding, a mechanism which eliminates the top feeding habits of fish and addresses the condition in fish which is known as Physostomous, or air-bladder disease.

Another aspect of the present invention is to provide a controller with a built-in thermometer and a complete set of diodes, sensors and probes which can grant the aquarist with a digital display of pertinent real time information regarding the current status of their existing water conditions.

An aspect of the present invention is to provide a lighting system with controller.

An aspect of the present invention is to provide a refugium chamber which can hold an after market or optional internal sump sub filter with c.o.d. and bioskimmer, elevation stand, and light, this adds mechanical filtration to the system.

Another aspect of the present invention is to provide a compatible new member to an already growing family of scientifically engineered, designed and tested aquatic products which make up an entire B.A.W.P.S. process system for both internal and external water transfer, purification, and processing.

This invention relates generally to the field of aquatics and more specifically, to the processes used in the transfer of water from an aquarium or main tank/habitat chamber containment area, sump or pond and out into an attached or free standing filtration unit for processing before then returning the water back to the aquarium or main tank/habitat chamber containment area, sump or pond, once again.

Since the invention of the sump filter, participants in the aquatics game have strived for perfection and reliability in the techniques and equipment being used for aquatic water processing, all while enjoying the fun filled world of aquatics and the personal and family gratification which such activities provide.

There is a complete industry built in the support of the hobby of aquatics. From standard and specialty designed tanks, sumps, filtration systems, lighting and equipment, to multi-million-dollar aquariums which are located all over the world.

Designs and patents exist on all phases of both indoor and outdoor system designs and supporting equipment. Currently, a fully option filled tower sump filter w/c.o.d. and bioskimmer design has no present representation in any type of modern aquatic market place, with the exception of existing units that may look similar in nature, but have no tower, c.o.d., bioskimmer, or wet/dry system, or any connection to an overall complete system configuration which is as versatile and expansive as the in-depth biologic water purification sump filter system design being presented.

BRIEF DESCRIPTION OF THE DRAWINGS

FIG. 1 depicts an exploded perspective assembly view of all the parts contained in the embodiment of the present invention.

FIG. 2 depicts a front perspective assembly view of all the parts contained in the embodiment of an optional FIG. 2 over flow box filter with manual soak feeder attachment version AT, and FIG. 2 over flow box filter with automatic soak feeder attachment version AU, from the embodiment of the present invention.

FIG. 3 depicts a front perspective assembly view of all the parts contained in the embodiment of an optional FIG. 3 refugium sump box filter with c.o.d. AV, and FIG. 3 refugium sump box filter with c.o.d. and manual soak feeder attachment version AW, from the embodiment of the present invention.

FIG. 4 depicts a front perspective assembly view of all the parts contained in the embodiment of an optional FIG. 4 refugium sump multi spectrum lighting system with remote AQ, AR, AS, from the embodiment of the present invention.

FIG. 5 depicts a front perspective assembly view of all the parts contained in the embodiment of an optional FIG. 5 refugium sump water chiller unit AG, and FIG. 5 refugium sump system pump type 202, FIG. 5 refugium sump system water heater AP from the embodiment of the present invention.

FIG. 6 depicts a block diagram bill of materials or BOM which consists of individual line items as each is depicted in their alphabetical order of appearance as shown in FIG. 1, FIG. 2, FIG. 3, FIG. 4, and FIG. 5, from the embodiment of the present invention.

FIG. 13 depicts a front perspective view of FIG. 1 sump exterior panel bottom A, from the embodiment of the present invention.

FIG. 14 depicts a left side plan view of FIG. 1 sump exterior panel bottom A, from the embodiment of the present invention.

FIG. 15 depicts a front plan view of FIG. 1 sump exterior panel bottom A, from the embodiment of the present invention.

Figures 25, 26, 27:
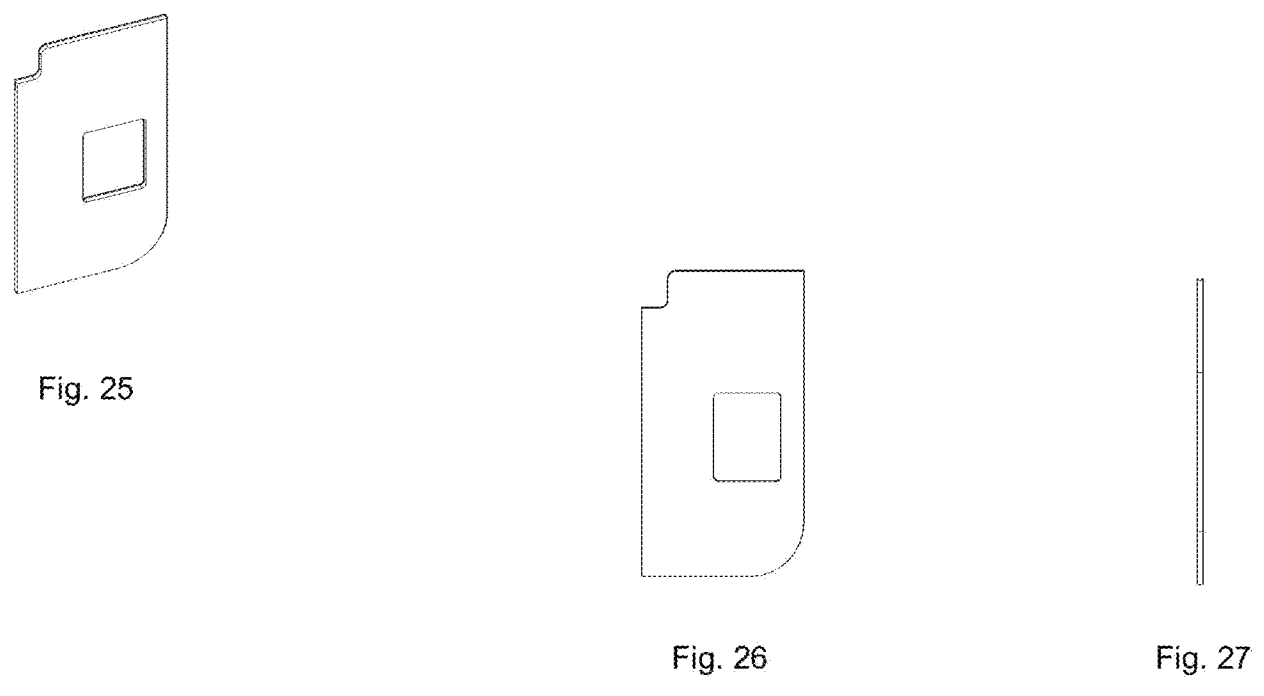

FIG. 25 depicts a front perspective view of FIG. 1 sump interior panel bank filter pump chamber separation E, from the embodiment of the present invention.

FIG. 26 depicts a front plan view of FIG. 1 sump interior panel bank filter pump chamber separation E, from the embodiment of the present invention.

FIG. 27 depicts a right side view of FIG. 1 sump interior panel bank filter pump chamber separation E, from the embodiment of the present invention.

FIG. 28 depicts a front perspective assembly view of FIG. 1 sump interior bank filter F, G, H, I, from the embodiment of the present invention, this adds mechanical filtration to the system.

FIG. 29 depicts a front perspective view of FIG. 1 sump interior bank filter slide frame F, from the embodiment of the present invention.

FIG. 30 depicts a front plan view of FIG. 1 sump interior bank filter slide frame F, from the embodiment of the present invention.

FIG. 31 depicts a back view of FIG. 1 sump interior bank filter slide frame F, from the embodiment of the present invention.

FIG. 32 depicts a left side plan view of FIG. 1 sump interior bank filter slide frame F, from the embodiment of the present invention.

FIG. 33 depicts a front perspective view of FIG. 1 sump interior bank filter slide frame plate G, from the embodiment of the present invention.

FIG. 34 depicts a front plan view of FIG. 1 sump interior bank filter slide frame plate G, from the embodiment of the present invention.

FIG. 35 depicts a left side plan view of FIG. 1 sump interior bank filter slide frame plate G, from the embodiment of the present invention.

FIG. 36 depicts a front perspective view of FIG. 1 sump interior bank filter slide frame pre-filter screen H, from the embodiment of the present invention, this adds mechanical filtration to the system.

FIG. 37 depicts a front plan view of FIG. 1 sump interior bank filter slide frame pre-filter screen H, from the embodiment of the present invention.

FIG. 38 depicts a left side plan view of FIG. 1 sump interior bank filter slide frame pre-filter screen H, from the embodiment of the present invention.

FIG. 39 depicts a front perspective assembly view of FIG. 1 sump interior bank filter slide frame pre-filter screen lock plate I, from the embodiment of the present invention, this adds mechanical filtration to the system.

FIG. 40 depicts a front plan view of FIG. 1 sump interior bank filter slide frame pre-filter screen lock plate I, from the embodiment of the present invention.

FIG. 41 depicts a back plan view of FIG. 1 sump interior bank filter slide frame pre-filter screen lock plate I, from the embodiment of the present invention.

FIG. 42 depicts a left side plan view of FIG. 1 sump interior bank filter slide frame pre-filter screen lock plate I, from the embodiment of the present invention.

FIG. 59 depicts a front perspective assembly view of FIG. 1 sump interior system pump type-1 O1, from the embodiment of the present invention.

FIG. 60 depicts a front plan assembly view of FIG. 1 sump interior system pump type-1 O1, from the embodiment of the present invention.

FIG. 61 depicts a left side plan assembly view of FIG. 1 sump interior system pump type-1 O1, from the embodiment of the present invention.

FIG. 62 depicts a top plan assembly view of FIG. 1 sump interior system pump type-1 O1, from the embodiment of the present invention.

FIG. 63 depicts a bottom plan assembly view of FIG. 1 sump interior system pump type-1 O1, from the embodiment of the present invention.

FIG. 64 depicts a front perspective assembly view of FIG. 1 sump interior system pump type-2 O2, from the embodiment of the present invention.

FIG. 65 depicts a front plan assembly view of FIG. 1 sump interior system pump type-2 O2, from the embodiment of the present invention.

FIG. 66 depicts a left side plan assembly view of FIG. 1 sump interior system pump type-2 O2, from the embodiment of the present invention.

FIG. 67 depicts a top plan assembly view of FIG. 1 sump interior system pump type-2 O2, from the embodiment of the present invention.

FIG. 68 depicts a bottom plan assembly view of FIG. 1 sump interior system pump type-2 O2, from the embodiment of the present invention.

FIG. 69 depicts a front perspective assembly view of FIG. 1 sump interior sock tower frame support rails P1, P2, and also FIG. 1 sump interior sock tower frame front stop Q, and FIG. 1 sump interior sock tower frame R, and FIG. 1 sump interior sock tower frame slide S, from the embodiment of the present invention.

FIG. 70 depicts a front perspective view of FIG. 1 sump interior sock tower frame support rails P1, P2, from the embodiment of the present invention.

FIG. 71 depicts a front plan view of FIG. 1 sump interior sock tower frame support rails P1, P2, from the embodiment of the present invention.

FIG. 72 depicts a left side plan view of FIG. 1 sump interior sock tower frame support rails P1, P2, from the embodiment of the present invention.

FIG. 73 depicts a front perspective view of FIG. 1 sump interior sock tower frame front stop Q, from the embodiment of the present invention.

FIG. 74 depicts a front plan view of FIG. 1 sump interior sock tower frame front stop Q, from the embodiment of the present invention.

FIG. 75 depicts a left side plan view of FIG. 1 sump interior sock tower frame front stop Q, from the embodiment of the present invention.

FIG. 76 depicts a front perspective view of FIG. 1 sump interior sock tower frame R, from the embodiment of the present invention.

FIG. 77 depicts a front plan view of FIG. 1 sump interior sock tower frame R, from the embodiment of the present invention.

FIG. 78 depicts a left side plan view of FIG. 1 sump interior sock tower frame R, from the embodiment of the present invention.

FIG. 79 depicts a top plan view of FIG. 1 sump interior sock tower frame R, from the embodiment of the present invention.

FIG. 80 depicts a front perspective view of FIG. 1 sump interior sock tower frame S, from the embodiment of the present invention.

FIG. 81 depicts a front plan view of FIG. 1 sump interior sock tower frame S, from the embodiment of the present invention.

FIG. 82 depicts a top plan view of FIG. 1 sump interior sock tower frame S, from the embodiment of the present invention.

FIG. 83 depicts a front perspective assembly view of FIG. 1 sump interior sock tower frame front stop Q, and FIG. 1 sump interior sock tower frame R, and FIG. 1 sump interior sock tower frame slide S, and FIG. 1 sump interior sock tower frame sliding door T, and also FIG. 1 sump interior sock tower frame micron mesh pre-filter sock ring V, and FIG. 1 sump interior sock tower frame micron mesh pre-filter sock W, and FIG. 1 sump interior sock tower frame drain tie-in box X, from the embodiment of the present invention.

FIG. 84 depicts a front perspective view of FIG. 1 sump interior sock tower frame sliding door T, from the embodiment of the present invention.

FIG. 85 depicts a front plan view of FIG. 1 sump interior sock tower frame sliding door T, from the embodiment of the present invention.

FIG. 86 depicts a left side plan view of FIG. 1 sump interior sock tower frame sliding door T, from the embodiment of the present invention.

FIG. 87 depicts a bottom plan view of FIG. 1 sump interior sock tower frame sliding door T, from the embodiment of the present invention.

FIG. 88 depicts a front perspective view of FIG. 1 sump interior sock tower frame drain tie-in box X, from the embodiment of the present invention.

FIG. 89 depicts a front plan view of FIG. 1 sump interior sock tower frame drain tie-in box X, from the embodiment of the present invention.

FIG. 90 depicts a top plan view of FIG. 1 sump interior sock tower frame drain tie-in box X, from the embodiment of the present invention.

FIG. 91 depicts a bottom plan view of FIG. 1 sump interior sock tower frame drain tie-in box X, from the embodiment of the present invention.

FIG. 92 depicts a front perspective assembly view of FIG. 1 sump interior sock tower frame micron mesh pre-filter sock W, and FIG. 1 sump interior sock tower frame drain tie-in box X, from the embodiment of the present invention.

FIG. 93 depicts a front plan assembly view of FIG. 1 sump interior sock tower frame micron mesh pre-filter sock W, and FIG. 1 sump interior sock tower frame drain tie-in box X, from the embodiment of the present invention.

FIG. 94 depicts a top plan assembly view of FIG. 1 sump interior sock tower frame micron mesh pre-filter sock W, and FIG. 1 sump interior sock tower frame drain tie-in box X, from the embodiment of the present invention.

FIG. 95 depicts a bottom plan assembly view of FIG. 1 sump interior sock tower frame micron mesh pre-filter sock W, and FIG. 1 sump interior sock tower frame drain tie-in box X, from the embodiment of the present invention.

FIG. 96 depicts a front perspective assembly view of FIG. 1 sump interior sock tower frame front stop Q, and FIG. 1 sump interior sock tower frame R, and FIG. 1 sump interior sock tower frame slide S, and FIG. 1 sump interior sock tower frame sliding door T, from the embodiment of the present invention.

FIG. 97 depicts a front perspective view of FIG. 1 sump interior sock tower frame sliding door T, from the embodiment of the present invention.

FIG. 98 depicts a front plan view of FIG. 1 sump interior sock tower frame sliding door T, with the location of Section A-A, from the embodiment of the present invention shown.

FIG. 99 depicts a Section A-A view, of FIG. 1 sump interior sock tower frame sliding door T, from the embodiment of the present invention.

FIG. 100 depicts a front perspective assembly view of FIG. 1 sump interior sock tower frame micron mesh pre-filter sock ring V, and FIG. 1 sump interior sock tower frame micron mesh pre-filter sock W, and FIG. 1 sump interior sock tower frame drain tie-in box X, from the embodiment of the present invention.

FIG. 101 depicts a front perspective view of FIG. 1 sump interior sock tower frame drain tie-in box X, from the embodiment of the present invention.

FIG. 102 depicts a top plan view of FIG. 1 sump interior sock tower frame drain tie-in box X, with the location of Section B-B, from the embodiment of the present invention shown.

FIG. 103 depicts a Section B-B view, of FIG. 1 sump interior sock tower frame drain tie-in box X, from the embodiment of the present invention.

FIG. 104 depicts a front perspective view of FIG. 1 sump interior sock tower frame micron mesh pre-filter sock ring V, and FIG. 1 sump interior sock tower frame micron mesh pre-filter sock W, from the embodiment of the present invention.

FIG. 105 depicts a top plan view of FIG. 1 sump interior sock tower frame micron mesh pre-filter sock ring V, and FIG. 1 sump interior sock tower frame micron mesh pre-filter sock W, with the location of Section B-B, from the embodiment of the present invention shown.

FIG. 106 depicts a Section B-B view, of FIG. 1 sump interior sock tower frame micron mesh pre-filter sock ring V, and FIG. 1 sump interior sock tower frame micron mesh pre-filter sock W, from the embodiment of the present invention.

FIG. 120 depicts a bottom plan view of optional FIG. 1 sump interior bio media storage generator drip tray box AA, from the embodiment of the present invention.

FIG. 121 depicts a front perspective assembly view of FIG. 1 sump interior bio media storage drain box quite flow down plate Y, and FIG. 1 sump interior bio media storage drain support plate Z, and optional FIG. 1 sump interior bio media storage generator drip tray box AA, from the embodiment of the present invention.

FIG. 122 depicts a front plan view of optional FIG. 1 sump interior bio media storage generator drip tray box AA, with the location of Section D-D, from the embodiment of the present invention shown.

FIG. 123 depicts a Section D-D view, of optional FIG. 1 sump interior bio media storage generator drip tray box AA, from the embodiment of the present invention.

FIG. 124 depicts a front perspective assembly view of FIG. 1 sump interior bio media storage drain box quite flow down plate Y, and FIG. 1 sump interior bio media storage drain support plate Z, and optional FIG. 1 sump interior bio stack two stage/three-phase bacteria storage generators AA, AB, AC, from the embodiment of the present invention.

FIG. 125 depicts a front perspective view of optional FIG. 1 sump interior bio stack two stage/three-phase bacteria storage generators AB, AC, AD, from the embodiment of the present invention.

FIG. 126 depicts a front plan view of optional FIG. 1 sump interior bio stack two stage/three-phase bacteria storage generators AB, AC, AD, from the embodiment of the present invention.

FIG. 127 depicts a left side plan view of optional FIG. 1 sump interior bio stack two stage/three-phase bacteria storage generators AB, AC, AD, from the embodiment of the present invention.

FIG. 128 depicts a top plan view of optional FIG. 1 sump interior bio stack two stage/three-phase bacteria storage generators AB, AC, AD, from the embodiment of the present invention.

FIG. 129 depicts a left side plan assembly view of FIG. 1 sump interior bio media storage drain box quite flow down plate Y, and FIG. 1 sump interior bio media storage drain support plate Z, and optional FIG. 1 sump interior bio stack two stage/three-phase bacteria storage generators AA, AB, AC, from the embodiment of the present invention.

FIG. 130 depicts a top plan view of optional FIG. 1 sump interior bio stack two stage/three-phase bacteria storage generators AB, AC, AD, from the embodiment of the present invention.

FIG. 131 depicts a front plan view of optional FIG. 1 sump interior bio stack two stage/three-phase bacteria storage generators AB, AC, AD, with the location of Section E-E, from the embodiment of the present invention shown.

FIG. 132 depicts a Section E-E view, of optional FIG. 1 sump interior bio stack two stage/three-phase bacteria storage generators AB, AC, AD, from the embodiment of the present invention.

Figure 133:
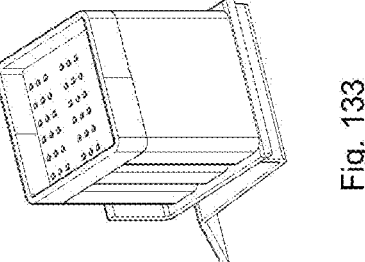

FIG. 133 depicts a front perspective assembly view of FIG. 1 sump interior bio media storage drain box quite flow down plate Y, and FIG. 1 sump interior bio media storage drain support plate Z, and optional FIG. 1 sump interior bio stack two stage/three-phase bacteria storage generators AA, AB, AC, and FIG. 1 sump interior bio media storage generator drip tray AE, from the embodiment of the present invention.

Figure 134:
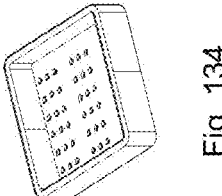

FIG. 134 depicts a front perspective view of FIG. 1 sump interior bio media storage generator drip tray AE, from the embodiment of the present invention.

Figure 135:
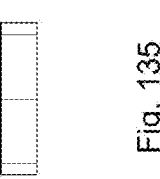

FIG. 135 depicts a front plan view of FIG. 1 sump interior bio media storage generator drip tray AE, from the embodiment of the present invention.

Figure 136:
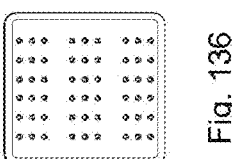

FIG. 136 depicts a top plan view of FIG. 1 sump interior bio media storage generator drip tray AE, from the embodiment of the present invention.

Figure 9:
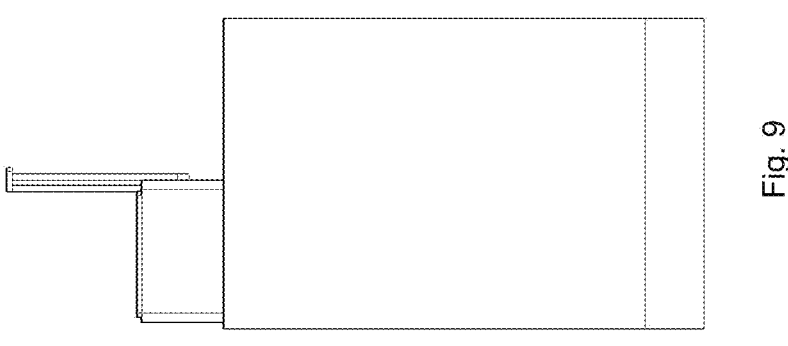
FIG. 9 depicts a left side plan view of the assembly unit without options, from the embodiment of the present invention.
Figure 8:
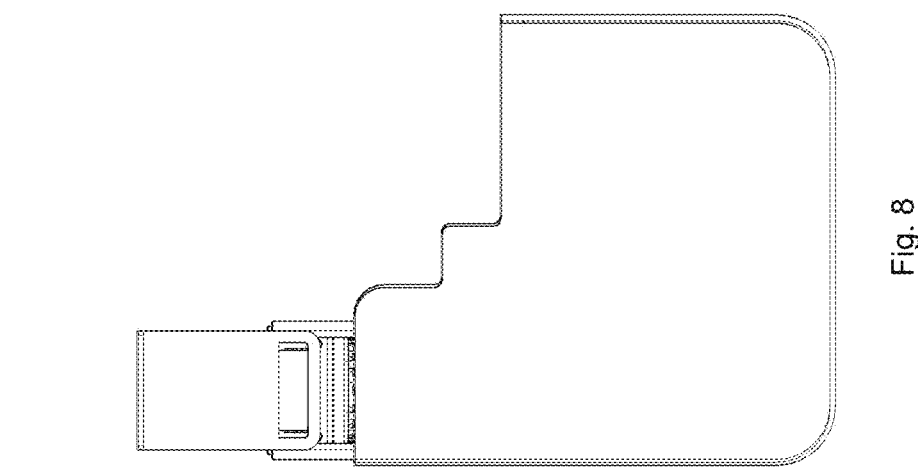
FIG. 8 depicts a front plan view of the assembly unit without options, from the embodiment of the present invention.
Figure 7:
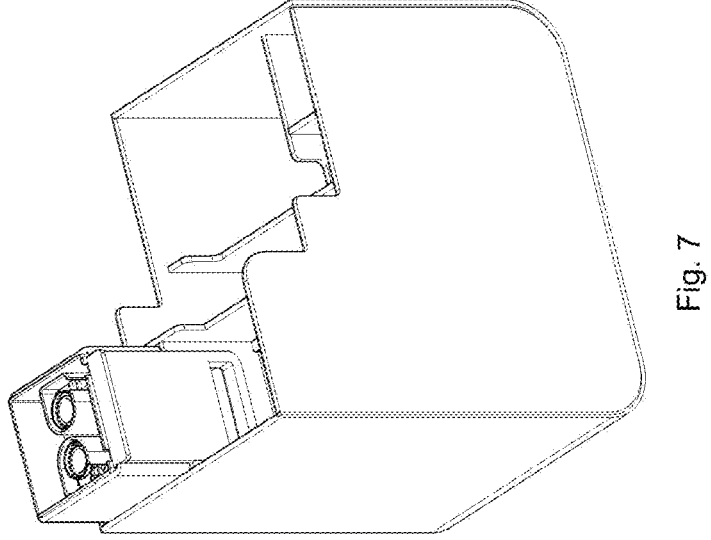
FIG. 7 depicts a front perspective view of the assembly unit without options, from the embodiment of the present invention.
Figure 12:
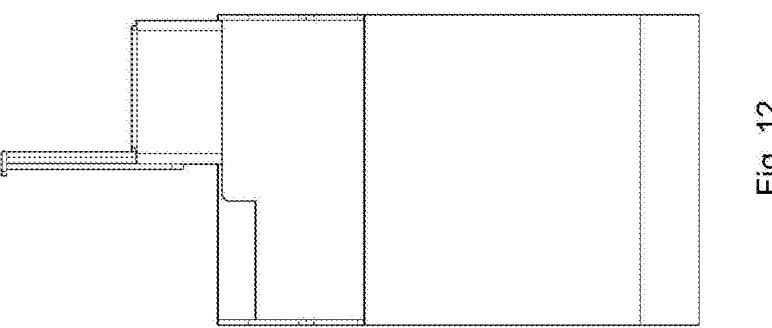
FIG. 12 depicts a right side plan view of the assembly unit without options, from the embodiment of the present invention.
Figure 11:
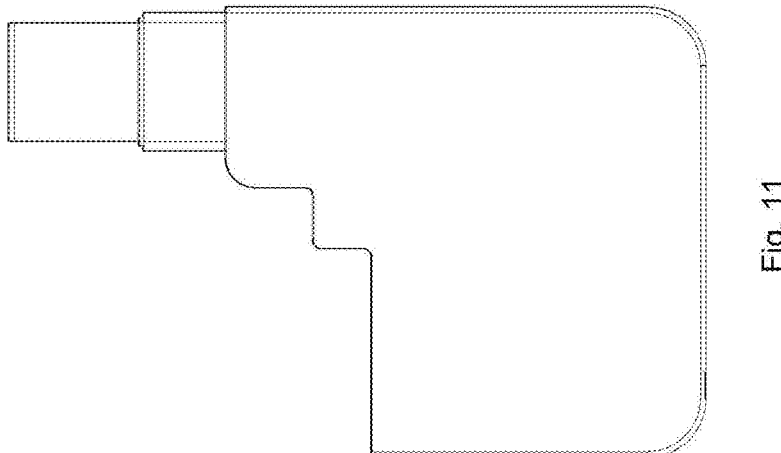
FIG. 11 depicts a back plan view of the assembly unit without options, from the embodiment of the present invention.
Figure 10:
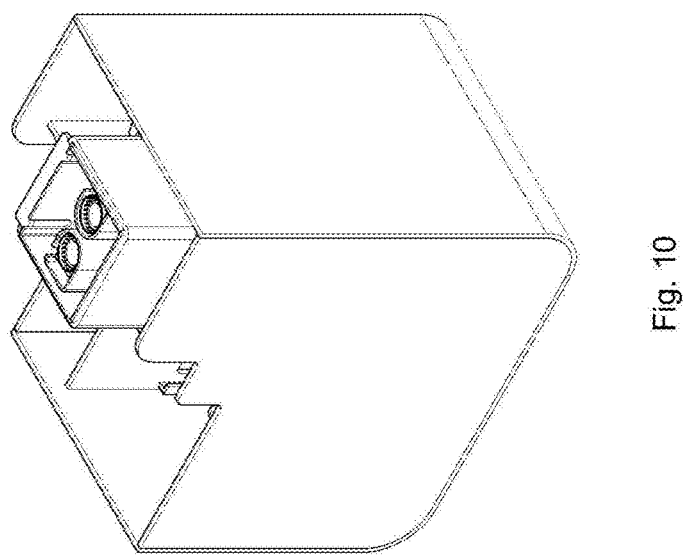
FIG. 10 depicts a back perspective view of the assembly unit without options, from the embodiment of the present invention.
Figure 18:
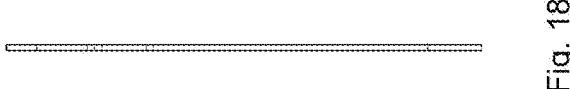
FIG. 18 depicts a right side plan view of FIG. 1 sump exterior panel front B1, and back B2, from the embodiment of the present invention.
Figure 17:
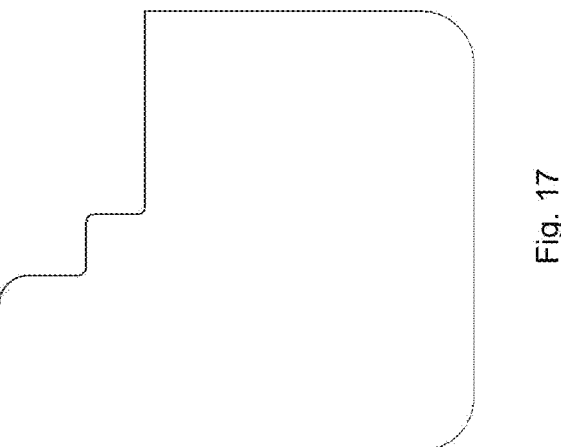
FIG. 17 depicts a front plan view of FIG. 1 sump exterior panel front B1, and back B2, from the embodiment of the present invention.
Figure 16:
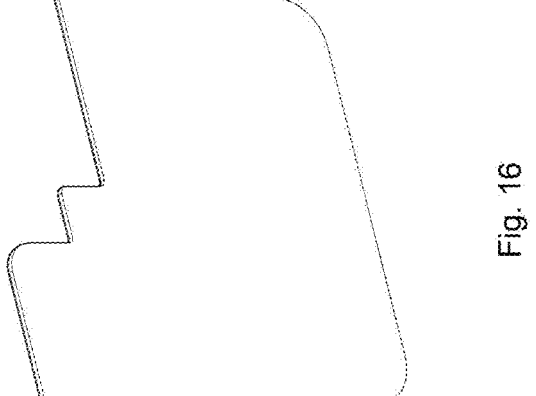
FIG. 16 depicts a front perspective view of FIG. 1 sump exterior panel front B1, and back B2, from the embodiment of the present invention.
Figure 21:
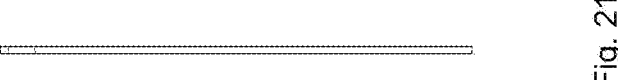
FIG. 21 depicts a right side plan view of FIG. 1 sump interior panel refugium separation C, from the embodiment of the present invention.
Figure 20:
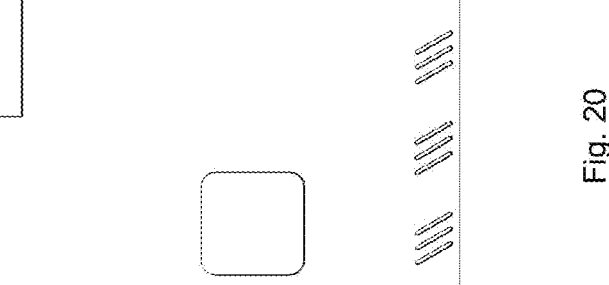
FIG. 20 depicts a front plan view of FIG. 1 sump interior panel refugium separation C, from the embodiment of the present invention.
Figure 19:
FIG. 19 depicts a front perspective view of FIG. 1 sump interior panel refugium separation C, from the embodiment of the present invention.
Figure 24:
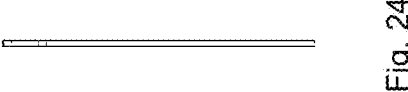
FIG. 24 depicts a right side view of FIG. 1 sump interior panel pump chamber separation D, from the embodiment of the present invention.
Figure 23:
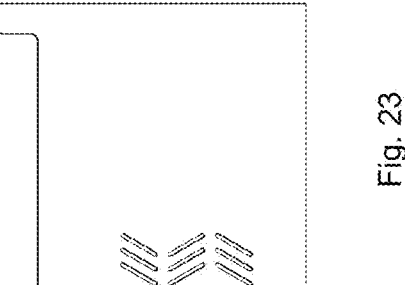
FIG. 23 depicts a front plan view of FIG. 1 sump interior panel pump chamber separation D, from the embodiment of the present invention.
Figure 22:
FIG. 22 depicts a front perspective view of FIG. 1 sump interior panel pump chamber separation D, from the embodiment of the present invention.
Figures 46, 49, 52, 55, 58:
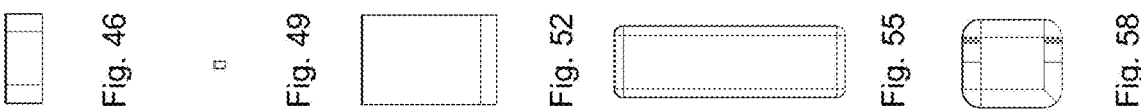
FIG. 46 depicts a left side plan view of FIG. 1 sump interior food storage tray K, from the embodiment of the present invention.
FIG. 49 depicts a front plan view of FIG. 1 sump interior food storage tray rails J1, J2, from the embodiment of the present invention.
FIG. 52 depicts a right side plan view of FIG. 1 sump interior panel food storage tray bridge L, from the embodiment of the present invention.
FIG. 55 depicts a left side plan view of FIG. 1 sump interior mud bank media pre-filter sponge M, from the embodiment of the present invention.
FIG. 58 depicts a left side plan view of FIG. 1 sump interior mud bank media pre-filter micron mesh with mud media N, from the embodiment of the present invention.
Figures 45, 48, 51, 54, 57:
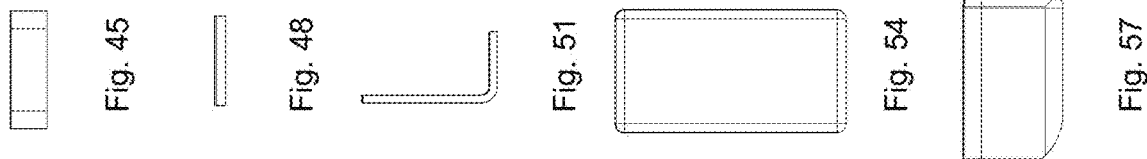
FIG. 45 depicts a front plan view of FIG. 1 sump interior food storage tray K, from the embodiment of the present invention.
FIG. 48 depicts a left side plan view of FIG. 1 sump interior food storage tray rails J1, J2, from the embodiment of the present invention.
FIG. 51 depicts a back plan view of FIG. 1 sump interior panel food storage tray bridge L, from the embodiment of the present invention.
FIG. 54 depicts a front plan view of FIG. 1 sump interior mud bank media pre-filter sponge M, from the embodiment of the present invention.
FIG. 57 depicts a back plan view of FIG. 1 sump interior mud bank media pre-filter micron mesh with mud media N, from the embodiment of the present invention.
Figures 44, 47, 50, 53, 56:
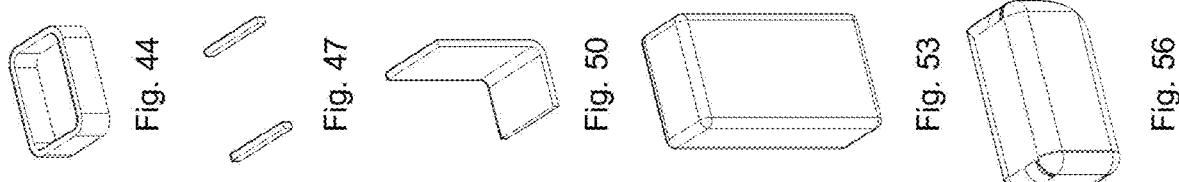
FIG. 44 depicts a front perspective view of FIG. 1 sump interior food storage tray K, from the embodiment of the present invention.
FIG. 47 depicts a front perspective view of FIG. 1 sump interior food storage tray rails J1, J2, from the embodiment of the present invention.
FIG. 50 depicts a front perspective view of FIG. 1 sump interior panel food storage tray bridge L, from the embodiment of the present invention.
FIG. 53 depicts a front perspective view of FIG. 1 sump interior mud bank media pre-filter sponge M, from the embodiment of the present invention.
FIG. 56 depicts a front perspective view of FIG. 1 sump interior mud bank media pre-filter micron mesh with mud media N, from the embodiment of the present invention.
Figure 43:
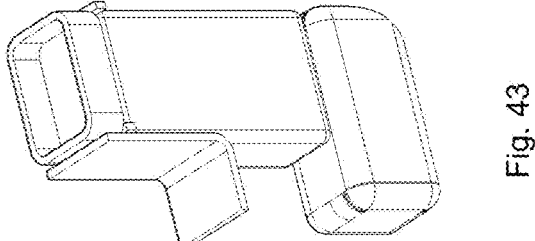
FIG. 43 depicts a front perspective assembly view of FIG. 1 sump interior food storage tray support rails J1, J2, and FIG. 1 sump interior food storage tray K, and FIG. 1 sump interior panel food storage tray bridge L, and FIG. 1 sump interior mud bank media pre-filter sponge M, and FIG. 1 sump interior mud bank media pre-filter micron mesh with mud media N, from the embodiment of the present invention, this adds mechanical and biological filtration to the system.
Figure 111:
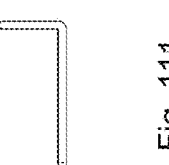
FIG. 111 depicts a right side plan view of FIG. 1 sump interior bio media storage drain box quite flow down plate Y, from the embodiment of the present invention.
Figure 115:
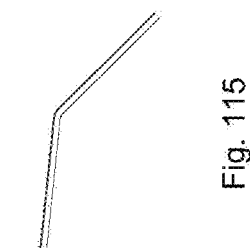
FIG. 115 depicts a right side plan view of FIG. 1 sump interior bio media storage drain support plate Z, from the embodiment of the present invention.
Figure 110:
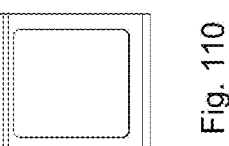
FIG. 110 depicts a top plan view of FIG. 1 sump interior bio media storage drain box quite flow down plate Y, from the embodiment of the present invention.
Figure 114:
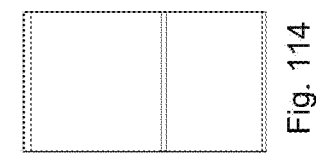
FIG. 114 depicts a top plan view of FIG. 1 sump interior bio media storage drain support plate Z, from the embodiment of the present invention.
Figure 109:
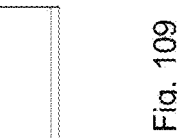
FIG. 109 depicts a front plan view of FIG. 1 sump interior bio media storage drain box quite flow down plate Y, from the embodiment of the present invention.
Figure 113:
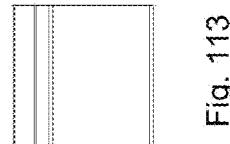
FIG. 113 depicts a front plan view of FIG. 1 sump interior bio media storage drain box quite flow down plate Y, from the embodiment of the present invention.
Figure 108:
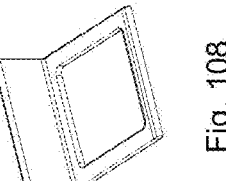
FIG. 108 depicts a front perspective view of FIG. 1 sump interior bio media storage drain box quite flow down plate Y, from the embodiment of the present invention.
Figure 112:
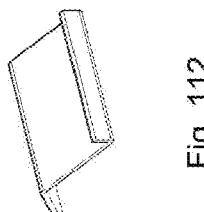
FIG. 112 depicts a front perspective view of FIG. 1 sump interior bio media storage drain support plate Z, from the embodiment of the present invention.
Figure 107:
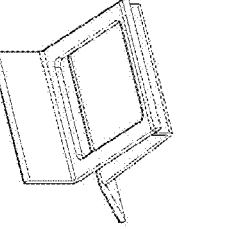
FIG. 107 depicts a front perspective assembly view of FIG. 1 sump interior bio media storage drain box quite flow down plate Y, and FIG. 1 sump interior bio media storage drain support plate Z, from the embodiment of the present invention.
Figure 120:
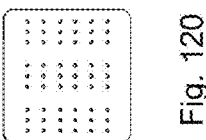
Figure 119:
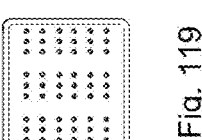
FIG. 119 depicts a top plan view of optional FIG. 1 sump interior bio media storage generator drip tray box AA, from the embodiment of the present invention.
Figure 123:
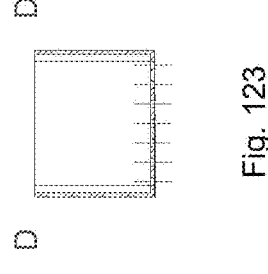
Figure 118:
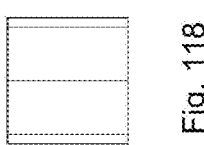
FIG. 118 depicts a front plan view of optional FIG. 1 sump interior bio media storage generator drip tray box AA, from the embodiment of the present invention.
Figure 122:
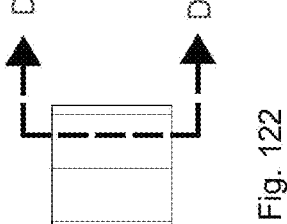
Figure 117:
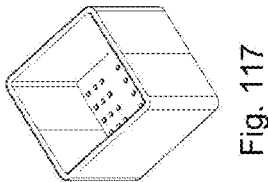
FIG. 117 depicts a front perspective view of optional FIG. 1 sump interior bio media storage generator drip tray box AA, from the embodiment of the present invention.
Figure 116:
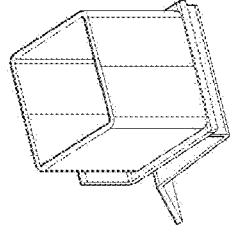
FIG. 116 depicts a front perspective assembly view of FIG. 1 sump interior bio media storage drain box quite flow down plate Y, and FIG. 1 sump interior bio media storage drain support plate Z, and optional FIG. 1 sump interior bio media storage generator drip tray box AA, from the embodiment of the present invention.
Figure 121:
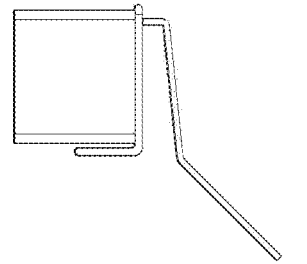
Figure 137:
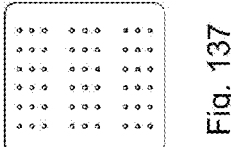

FIG. 137 depicts a bottom plan view of FIG. 1 sump interior bio media storage generator drip tray AE, from the embodiment of the present invention.

Figure 138:
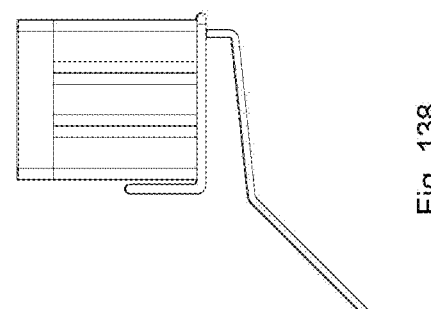

FIG. 138 depicts a left side plan assembly view of FIG. 1 sump interior bio media storage drain box quite flow down plate Y, and FIG. 1 sump interior bio media storage drain support plate Z, and optional FIG. 1 sump interior bio stack two stage/three-phase bacteria storage generators AA, AB, AC, and FIG. 1 sump interior bio media storage generator drip tray AE, from the embodiment of the present invention.

Figure 139:
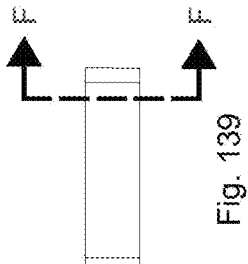

FIG. 139 depicts a front plan view of FIG. 1 sump interior bio media storage generator drip tray AE, with the location of Section F-F, from the embodiment of the present invention shown.

Figure 140:
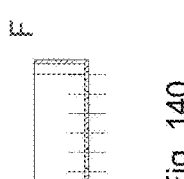

FIG. 140 depicts a Section F-F view, of FIG. 1 sump interior bio media storage generator drip tray AE, from the embodiment of the present invention.

Figure 141:
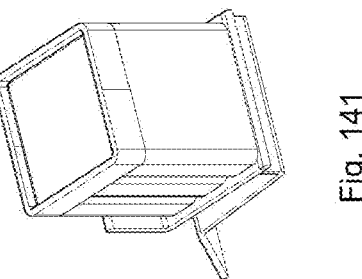

FIG. 141 depicts a front perspective assembly view of FIG. 1 sump interior bio media storage drain box quite flow down plate Y, and FIG. 1 sump interior bio media storage drain support plate Z, and optional FIG. 1 sump interior bio stack two stage/three-phase bacteria storage generators AA, AB, AC, and FIG. 1 sump interior bio media storage generator drip tray AE, and optional FIG. 1 sump interior bio media storage generator drip tray pre-filter sponge AF, from the embodiment of the present invention.

Figure 142:

FIG. 142 depicts a front perspective view of FIG. 1 sump interior bio media storage generator drip tray pre-filter sponge AF, from the embodiment of the present invention.

Figure 143:
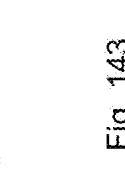

FIG. 143 depicts a left side plan view of FIG. 1 sump interior bio media storage generator drip tray pre-filter sponge AF, from the embodiment of the present invention.

Figure 144:
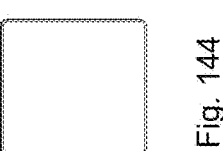

FIG. 144 depicts a top plan view of FIG. 1 sump interior bio media storage generator drip tray pre-filter sponge AF, from the embodiment of the present invention.

Figure 145:
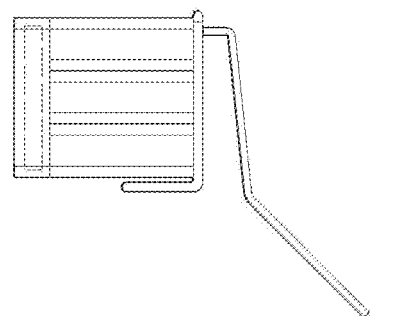

FIG. 145 depicts a left side plan assembly view of FIG. 1 sump interior bio media storage drain box quite flow down plate Y, and FIG. 1 sump interior bio media storage drain support plate Z, and FIG. 1 sump interior bio stack two stage/three-phase bacteria storage generators AA, AB, AC, and FIG. 1 sump interior bio media storage generator drip tray AE, and optional FIG. 1 sump interior bio media storage generator drip tray pre-filter sponge AF, from the embodiment of the present invention.

Figure 146:
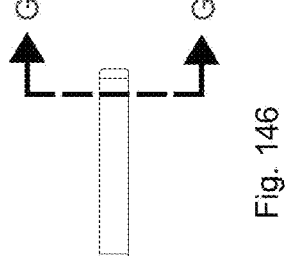

FIG. 146 depicts a left side plan view of FIG. 1 sump interior bio media storage generator drip tray pre-filter sponge AF, with the location of Section G-G, from the embodiment of the present invention shown.

Figure 147:
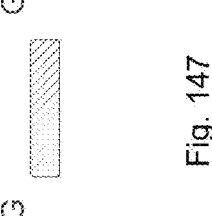

FIG. 147 depicts a Section G-G view, of FIG. 1 sump interior bio media storage generator drip tray pre-filter sponge AF, from the embodiment of the present invention.

Figures 148, 149, 150, 151, 152, 153, 154, 155:
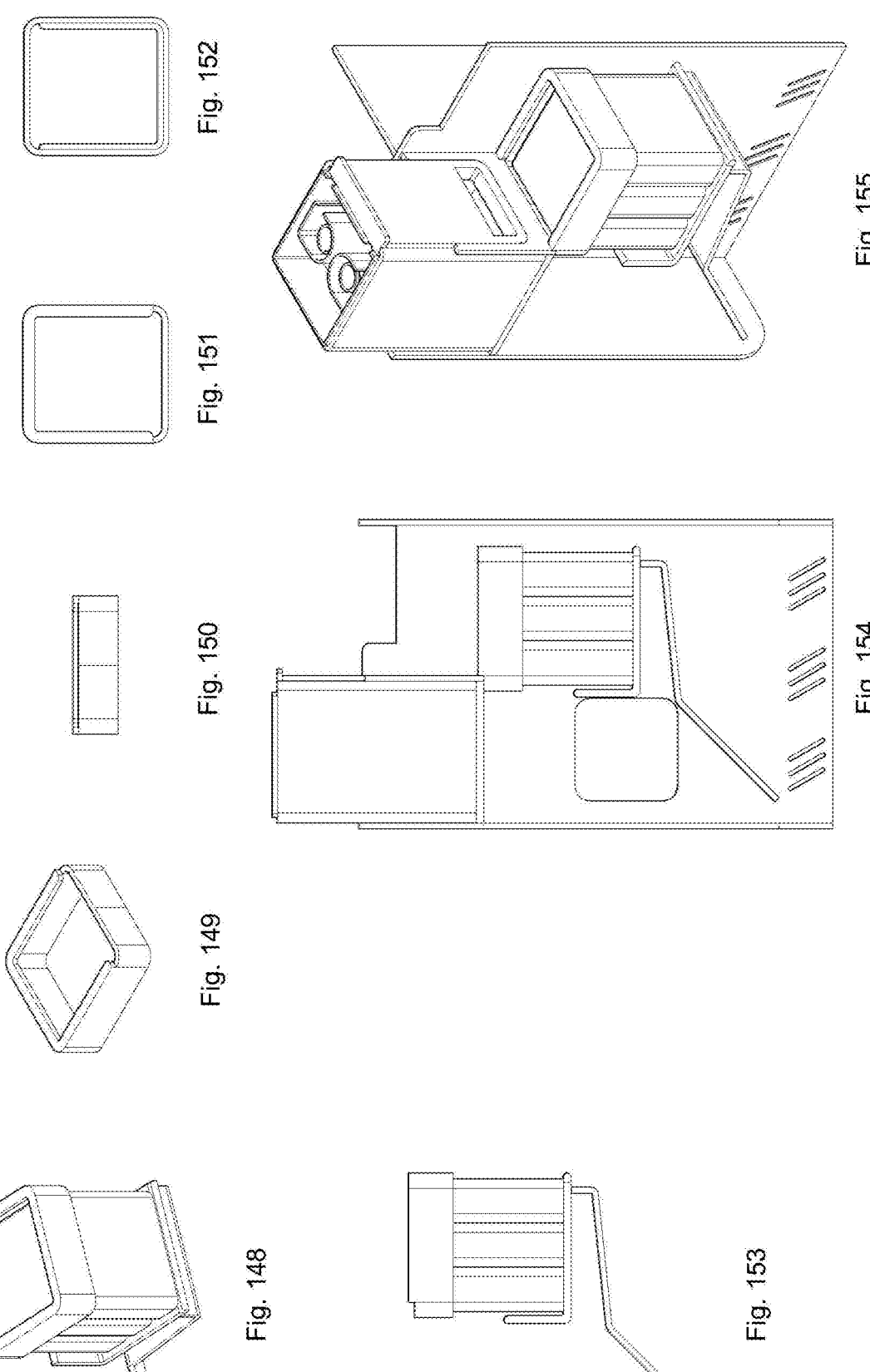

FIG. 148 depicts a front perspective assembly view of FIG. 1 sump interior bio media storage drain box quite flow down plate Y, and FIG. 1 sump interior bio media storage drain support plate Z, and optional FIG. 1 sump interior bio stack two stage/three-phase bacteria storage generators AA, AB, AC, and FIG. 1 sump interior bio media storage generator drip tray AE, and optional FIG. 1 sump interior bio media storage generator drip tray pre-filter sponge AF, and FIG. 1 sump interior bio media storage generator drip tray splash guard lock plate AG, from the embodiment of the present invention.

FIG. 149 depicts a front perspective view of FIG. 1 sump interior bio media storage generator drip tray splash guard lock plate AG, from the embodiment of the present invention.

FIG. 150 depicts a front plan view of FIG. 1 sump interior bio media storage generator drip tray splash guard lock plate AG, from the embodiment of the present invention.

FIG. 151 depicts a top plan view of FIG. 1 sump interior bio media storage generator drip tray splash guard lock plate AG, from the embodiment of the present invention.

FIG. 152 depicts a bottom plan view of FIG. 1 sump interior bio media storage generator drip tray splash guard lock plate AG, from the embodiment of the present invention.

FIG. 153 depicts a left side plan assembly view of FIG. 1 sump interior bio media storage drain box quite flow down plate Y, and FIG. 1 sump interior bio media storage drain support plate Z, and optional FIG. 1 sump interior bio stack two stage/three-phase bacteria storage generators AA, AB, AC, and FIG. 1 sump interior bio media storage generator drip tray AE, and optional FIG. 1 sump interior bio media storage generator drip tray pre-filter sponge AF, and FIG. 1 sump interior bio media storage generator drip tray splash guard lock plate AG, from the embodiment of the present invention.

FIG. 154 depicts a left side open plan assembly view of FIG. 1 sump exterior panel front B1, and FIG. 1 sump exterior panel back B2, and FIG. 1 sump interior panel refugium separation C, and FIG. 1 sump interior sock tower frame front stop Q, and sump interior sock tower frame support rails P1, P2, and FIG. 1 sump interior sock tower frame R, and FIG. 1 sump interior sock tower frame slide S, and FIG. 1 sump interior sock tower frame sliding door T, and FIG. 1 sump interior sock tower frame micron mesh pre-filter sock ring V, and FIG. 1 sump interior sock tower frame micron mesh pre-filter sock W, and FIG. 1 sump interior sock tower frame drain tie-in box X, and FIG. 1 sump interior bio media storage drain box quite flow down plate Y, and FIG. 1 sump interior bio media storage drain support plate Z, and optional FIG. 1 sump interior bio stack two stage/three-phase bacteria storage generators AA, AB, AC, and FIG. 1 sump interior bio media storage generator drip tray AE, and optional FIG. 1 sump interior bio media storage generator drip tray pre-filter sponge AF, and FIG. 1 sump interior bio media storage generator drip tray splash guard lock plate AG, from the embodiment of the present invention.

FIG. 155 depicts a front open perspective assembly view of FIG. 1 sump exterior panel front B1, and FIG. 1 sump exterior panel back B2, and FIG. 1 sump interior panel refugium separation C, and FIG. 1 sump interior sock tower frame front stop Q, and sump interior sock tower frame support rails P1, P2, FIG. 1 sump interior sock tower frame R, and FIG. 1 sump interior sock tower frame slide S, and FIG. 1 sump interior sock tower frame sliding door T, and FIG. 1 sump interior sock tower frame micron mesh pre-filter sock ring V, and FIG. 1 sump interior sock tower frame micron mesh pre-filter sock W, and FIG. 1 sump interior sock tower frame drain tie-in box X, and FIG. 1 sump interior bio media storage drain box quite flow down plate Y, and FIG. 1 sump interior bio media storage drain support plate Z, and optional FIG. 1 sump interior bio stack two stage/three-phase bacteria storage generators AA, AB, AC, and FIG. 1 sump interior bio media storage generator drip tray AE, and optional FIG. 1 sump interior bio media storage generator drip tray pre-filter sponge AF, and FIG. 1 sump interior bio media storage generator drip tray splash guard lock plate AG, from the embodiment of the present invention.

Figure 156:
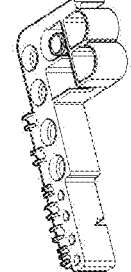

FIG. 156 depicts a front perspective view of FIG. 1 sump rail DPC doser, probe, chiller manifold/harness AH, from the embodiment of the present invention.

Figure 157:
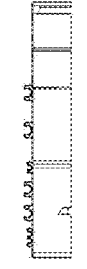

FIG. 157 depicts a front plan view of FIG. 1 sump rail DPC doser, probe, chiller manifold/harness AH, from the embodiment of the present invention.

Figure 158:
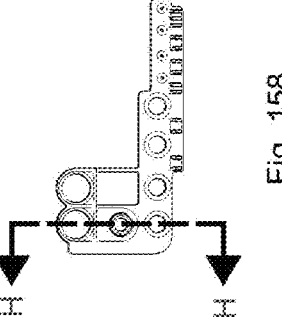

FIG. 158 depicts a top plan view of FIG. 1 sump rail DPC doser, probe, chiller manifold/harness AH, with the location of Section H-H, from the embodiment of the present invention shown.

Figure 159:

FIG. 159 depicts a left side plan view of FIG. 1 sump rail DPC doser, probe, chiller manifold/harness AH, from the embodiment of the present invention.

Figure 160:
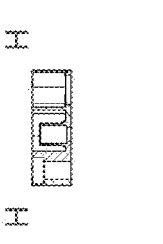

FIG. 160 depicts a Section H-H view, of FIG. 1 sump rail DPC doser, probe, chiller manifold/harness AH, from the embodiment of the present invention.

Figure 161:
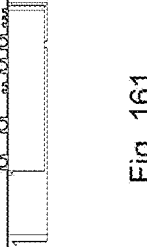

FIG. 161 depicts a back plan view of FIG. 1 sump rail DPC doser, probe, chiller manifold/harness AH, from the embodiment of the present invention.

Figure 162:
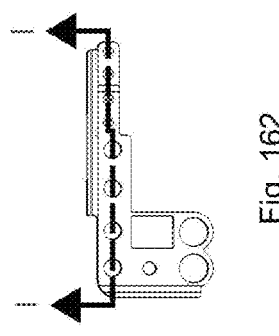

FIG. 162 depicts a top plan view of FIG. 1 sump rail DPC doser, probe, chiller manifold/harness AH, with the location of Section I-I, from the embodiment of the present invention shown.

Figure 163:
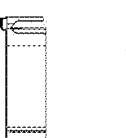

FIG. 163 depicts a right side plan view of FIG. 1 sump rail DPC doser, probe, chiller manifold/harness AH, from the embodiment of the present invention.

Figure 164:
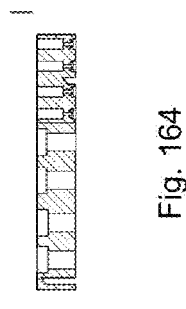

FIG. 164 depicts a Section I-I view, of FIG. 1 sump rail DPC doser, probe, chiller manifold/harness AH, from the embodiment of the present invention FIG. 165 depicts a front perspective view of FIG. 1 sump rail DPC doser, probe, chiller manifold/harness AH, and FIG. 1 sump rail DPC doser, probe, chiller manifold drop pipe AI, and FIG. 1 sump rail DPC doser, probe, chiller manifold probe insulators AJ1, AJ2, AJ3, AJ4, and FIG. 1 sump rail DPC doser, probe, chiller manifold probes AK1, AK2, AK3, AK4, from the embodiment of the present invention.

FIG. 166 depicts a front plan view of FIG. 1 sump rail DPC doser, probe, chiller manifold drop pipe AI, from the embodiment of the present invention.

FIG. 167 depicts a top plan view of FIG. 1 sump rail DPC doser, probe, chiller manifold drop pipe AI, with the location of Section J-J, from the embodiment of the present invention shown.

FIG. 168 depicts a Section J-J view, of FIG. 1 sump rail DPC doser, probe, chiller manifold drop pipe AI, from the embodiment of the present invention.

FIG. 169 depicts a front perspective assembly view of FIG. 1 sump rail DPC doser, probe, chiller manifold/harness AH, and FIG. 1 sump rail DPC doser, probe, chiller manifold drop pipe AI, and FIG. 1 sump rail DPC doser, probe, chiller manifold probe insulators AJ1, AJ2, AJ3, AJ4, and FIG. 1 sump rail DPC doser, probe, chiller manifold probes AK1, AK2, AK3, AK4, shown mounted in position, from the embodiment of the present invention.

FIG. 170 depicts a front plan view of FIG. 1 sump rail DPC doser, probe, chiller manifold probe insulator AJ1, with FIG. 1 sump rail DPC doser, probe, chiller manifold probe insulators AJ2, AJ3, AJ4 being typical, from the embodiment of the present invention.

FIG. 171 depicts a top plan view of FIG. 1 sump rail DPC doser, probe, chiller manifold probe insulator AJ1, with FIG. 1 sump rail DPC doser, probe, chiller manifold probe insulators AJ2, AJ3, AJ4 being typical, with the location of Section K-K, from the embodiment of the present invention shown.

FIG. 172 depicts a Section K-K view, of FIG. 1 sump rail DPC doser, probe, chiller manifold probe insulator AJ1, with FIG. 1 sump rail DPC doser, probe, chiller manifold probe insulators AJ2, AJ3, AJ4 being typical, from the embodiment of the present invention.

FIG. 173 depicts a front exploded perspective view of a FIG. 1 sump interior thermostatic control interface assembly AL, which consists of a thermostatic control interface housing front cover, thermostatic control interface housing gasket, thermostatic control interface housing battery, thermostatic control interface housing rear cover, thermostatic control interface housing diode sensor array, along with a front perspective view of the FIG. 1 sump interior thermostatic control interface assembly AL, shown assembled, from the embodiment of the present invention.

FIG. 174 depicts a front perspective view of a FIG. 1 sump interior thermostatic control interface assembly AL, shown mounted in place, from the embodiment of the present invention.

FIG. 175 depicts a back perspective view of a FIG. 1 sump interior thermostatic control interface assembly AL, shown mounted in place, from the embodiment of the present invention.

FIG. 176 depicts a front plan view of a FIG. 1 sump interior thermostatic control interface assembly AL, from the embodiment of the present invention.

FIG. 177 depicts a left side plan view of a FIG. 1 sump interior thermostatic control interface assembly AL, from the embodiment of the present invention.

FIG. 178 depicts a back plan view of a FIG. 1 sump interior thermostatic control interface assembly AL, from the embodiment of the present invention.

Figure 179:
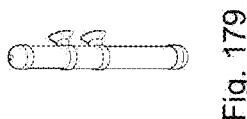

FIG. 179 depicts a front perspective view of a FIG. 1 sump interior heater assembly AP, from the embodiment of the present invention.

Figure 180:
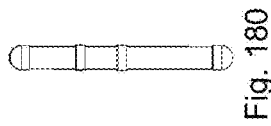

FIG. 180 depicts a front plan view of a FIG. 1 sump interior heater assembly AP, from the embodiment of the present invention.

Figure 181:
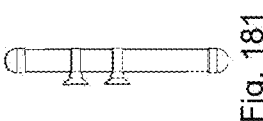

FIG. 181 depicts a left side plan view of a FIG. 1 sump interior heater assembly AP, from the embodiment of the present invention.

Figure 182:

FIG. 182 depicts a top plan view of a FIG. 1 sump interior heater assembly AP, from the embodiment of the present invention.

Figure 183:
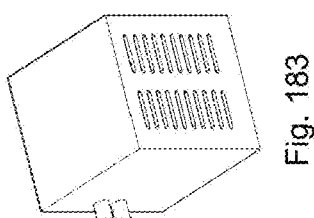

FIG. 183 depicts a front perspective view of a FIG. 1 exterior sump chiller unit assembly AO, from the embodiment of the present invention.

Figure 184:
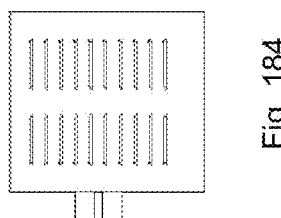

FIG. 184 depicts a front plan view of a FIG. 1 exterior sump chiller unit assembly AO, from the embodiment of the present invention.

Figure 185:
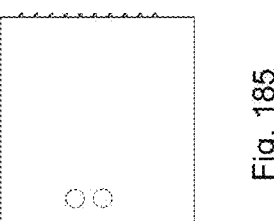

FIG. 185 depicts a left side plan view of a FIG. 1 exterior sump chiller unit assembly AO, from the embodiment of the present invention.

Figure 186:
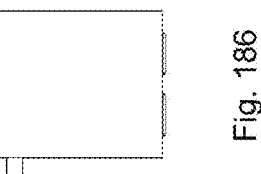

FIG. 186 depicts a top plan view of a FIG. 1 exterior sump chiller unit assembly AO, from the embodiment of the present invention.

Figures 187, 188, 189, 190, 191, 192, 193, 194, 195, 196, 197:
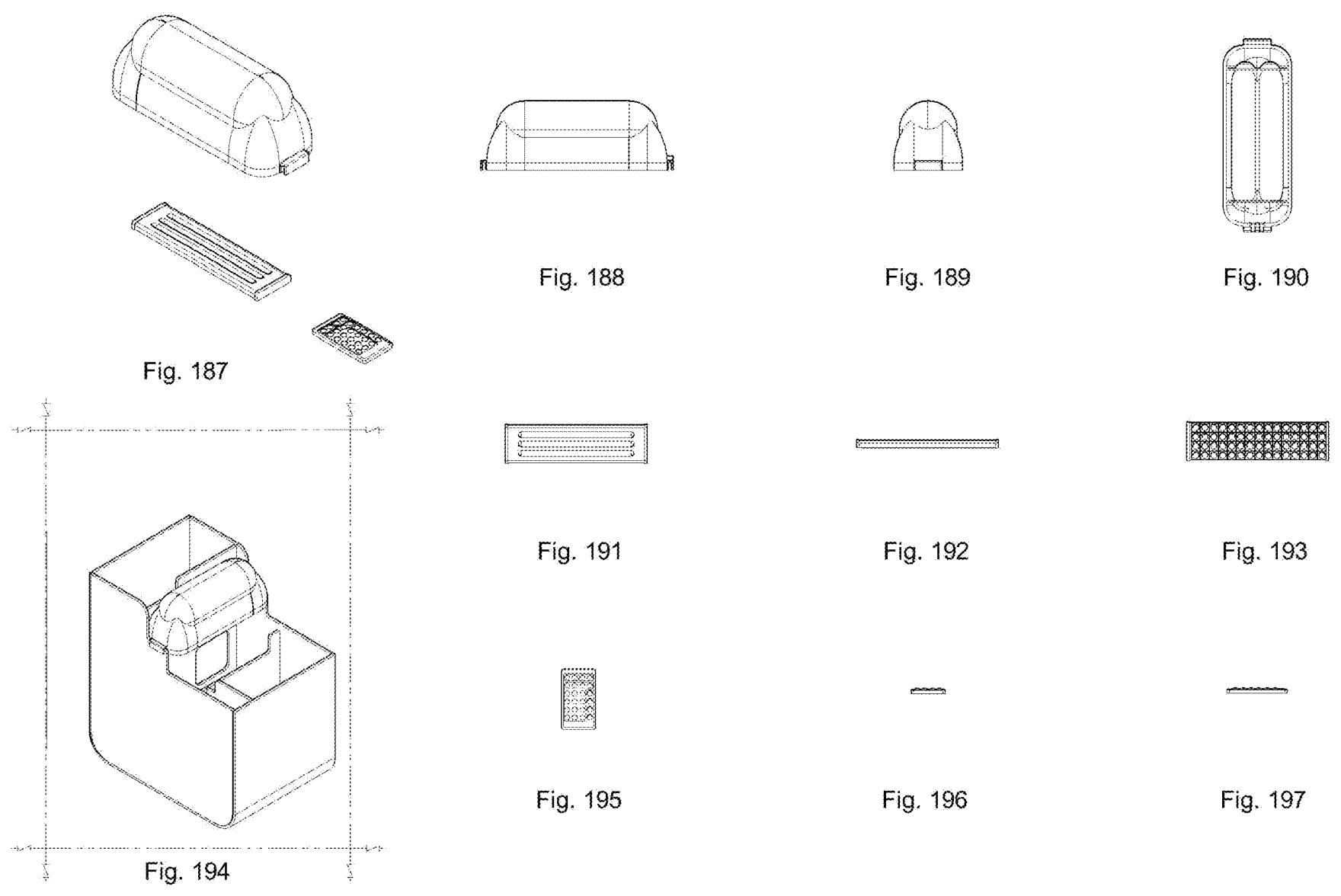

FIG. 187 depicts a front exploded perspective view of a FIG. 1 sump exterior light fixture LED array AR, and FIG. 1 sump exterior light fixture hood AQ, from the embodiment of the present invention.

FIG. 188 depicts a front plan view of a FIG. 1 sump exterior light fixture hood AQ, from the embodiment of the present invention.

FIG. 189 depicts a left side plan view of a FIG. 1 sump exterior light fixture hood AQ, from the embodiment of the present invention.

FIG. 190 depicts a bottom plan view of a FIG. 1 sump exterior light fixture hood AQ, from the embodiment of the present invention.

FIG. 191 depicts a top plan view of a FIG. 1 sump exterior light fixture LED array AR, from the embodiment of the present invention.

FIG. 192 depicts a left side plan view of a FIG. 1 sump exterior light fixture LED array AR, from the embodiment of the present invention.

FIG. 193 depicts a bottom plan view of a FIG. 1 sump exterior light fixture LED array AR, from the embodiment of the present invention.

FIG. 194 depicts a front perspective assembly view of a FIG. 1 sump exterior light fixture LED array AR, and FIG. 1 sump exterior light fixture hood AQ, mounted in place, from the embodiment of the present invention.

FIG. 195 depicts a top plan view of a FIG. 1 sump exterior light fixture remote control AS, from the embodiment of the present invention.

FIG. 196 depicts a front plan view of a FIG. 1 sump exterior light fixture remote control AS, from the embodiment of the present invention.

FIG. 197 depicts a left side plan view of a FIG. 1 sump exterior light fixture remote control AS, from the embodiment of the present invention.

FIG. 198 depicts a front perspective view of FIG. 1 sump exterior panel bottom A, from the embodiment of the present invention.

FIG. 199 depicts a front perspective view of FIG. 1 sump exterior panel front B1, and back B2, from the embodiment of the present invention.

FIG. 200 depicts a front perspective view of FIG. 1 sump interior panel refugium separation C, from the embodiment of the present invention.

FIG. 201 depicts a front perspective view of FIG. 1 sump interior panel pump chamber separation D, from the embodiment of the present invention.

FIG. 202 depicts a front perspective view of FIG. 1 sump interior panel bank filter pump separation E, from the embodiment of the present invention.

FIG. 203 depicts a front perspective view of FIG. 1 sump interior bank filter slide frame F, and FIG. 1 sump interior bank filter slide frame plate G, and FIG. 1 sump interior bank filter slide frame pre-filter screen H, and FIG. 1 sump interior bank filter slide frame pre-filter screen lock plate I, from the embodiment of the present invention.

FIG. 204 depicts a front perspective view of FIG. 1 sump interior food storage tray support rails J1, J2, and FIG. 1 sump interior food storage tray K, from the embodiment of the present invention.

FIG. 205 depicts a front perspective view of FIG. 1 sump interior panel food storage tray bridge L, from the embodiment of the present invention.

FIG. 206 depicts a front perspective view of FIG. 1 sump interior mud bank media pre-filter sponge M, from the embodiment of the present invention.

FIG. 207 depicts a front perspective view of FIG. 1 sump interior mud bank media pre-filter micron mesh with mud media N, from the embodiment of the present invention FIG. 208 depicts a front perspective assembly view of FIG. 1 B.A.W.P.S. multi tower sump filter internal system pump type-1 O1, from the embodiment of the present invention.

FIG. 209 depicts a front perspective assembly view of FIG. 1 sump interior system pump type-2 O2, from the embodiment of the present invention.

FIG. 210 depicts a front perspective assembly view of FIG. 1 sump interior sock tower frame support rails P1, P2, from the embodiment of the present invention.

FIG. 211 depicts a front perspective view of FIG. 1 sump interior sock tower frame front stop Q, from the embodiment of the present invention.

FIG. 212 depicts a front perspective view of FIG. 1 sump interior sock tower frame R, from the embodiment of the present invention.

FIG. 213 depicts a front perspective view of FIG. 1 sump interior sock tower frame S, from the embodiment of the present invention.

FIG. 214 depicts a front perspective view of FIG. 1 sump interior sock tower frame sliding door T, from the embodiment of the present invention.

FIG. 215 depicts a front perspective assembly view of FIG. 1 sump interior sock tower frame micron mesh pre-filter sock W, from the embodiment of the present invention.

FIG. 216 depicts a front perspective view of FIG. 1 sump interior sock tower frame drain tie-in box X, from the embodiment of the present invention.

FIG. 217 depicts a front perspective view of FIG. 1 sump interior bio media storage drain box quite flow down plate Y, from the embodiment of the present invention.

FIG. 218 depicts a front perspective view of FIG. 1 sump interior bio media storage drain support plate Z, from the embodiment of the present invention.

FIG. 219 depicts a front perspective view of an optional FIG. 1 sump interior bio media storage generator drip tray box AA, from the embodiment of the present invention.

FIG. 220 depicts a front perspective view of an optional FIG. 1 sump interior bio stack two stage/three-phase bacteria storage generators AB, AC, AD, from the embodiment of the present invention.

FIG. 221 depicts a front perspective view of FIG. 1 sump interior bio media storage generator drip tray AE, from the embodiment of the present invention.

FIG. 222 depicts a front perspective view of an optional FIG. 1 sump interior bio media storage generator drip tray pre-filter sponge AF, from the embodiment of the present invention.

FIG. 223 depicts a front perspective view of FIG. 1 sump interior bio media storage generator drip tray splash guard lock plate AG, from the embodiment of the present invention.

FIG. 224 depicts a front perspective view of FIG. 1 sump rail DPC doser, probe, chiller manifold/harness AH, from the embodiment of the present invention.

FIG. 225 depicts a front perspective view of an optional external sliding top off and fill soak feeder tank wall clip, and optional manual soak feeder assembly and also an optional automatic soak feeder assembly, from the embodiment of the present invention.

FIG. 226 depicts a front perspective view of an optional external sump tower tie-in over flow box filter without feeder AT, from the embodiment of the present invention.

FIG. 227 depicts a front perspective view of an optional external sump tower tie-in over flow box filter with feeder AU, from the embodiment of the present invention.

FIG. 228 depicts a front perspective view of an optional internal sump tower biologic trapping filter w/c.o.d. AV, from the embodiment of the present invention.

FIG. 229 depicts a front perspective view of an optional internal sump tower biologic trapping filter w/light and c.o.d. AW, from the embodiment of the present invention.

FIG. 230 depicts a front perspective view of FIG. 1 sump rail DPC doser, probe, chiller manifold drop pipe AI, from the embodiment of the present invention.

FIG. 231 depicts a front perspective view of FIG. 1 sump rail DPC doser, probe, chiller manifold probe insulators AJ1, AJ2, AJ3, AJ4, from the embodiment of the present invention.

FIG. 232 depicts a front perspective view of FIG. 1 sump rail DPC doser, probe, chiller manifold probes AK1, AK2, AK3, AK4, from the embodiment of the present invention.

FIG. 233 depicts a front perspective view of a FIG. 1 sump interior thermostatic control interface assembly AL, which consists of a thermostatic control interface housing front cover, thermostatic control interface housing gasket, thermostatic control interface housing battery, thermostatic control interface housing rear cover, thermostatic control interface housing diode sensor array, shown assembled, from the embodiment of the present invention.

FIG. 234 depicts a front perspective view of a FIG. 1 exterior sump chiller unit assembly AO, from the embodiment of the present invention.

FIG. 235 depicts a front perspective view of a FIG. 1 sump interior heater assembly AP, from the embodiment of the present invention.

FIG. 236 depicts a front perspective assembly view of a FIG. 1 sump exterior light fixture remote control AS, and FIG. 1 sump exterior light fixture LED array AR, from the embodiment of the present invention.

FIG. 237 depicts a top plan view of a FIG. 1 sump exterior light fixture hood AQ, from the embodiment of the present invention.

Figure 238:
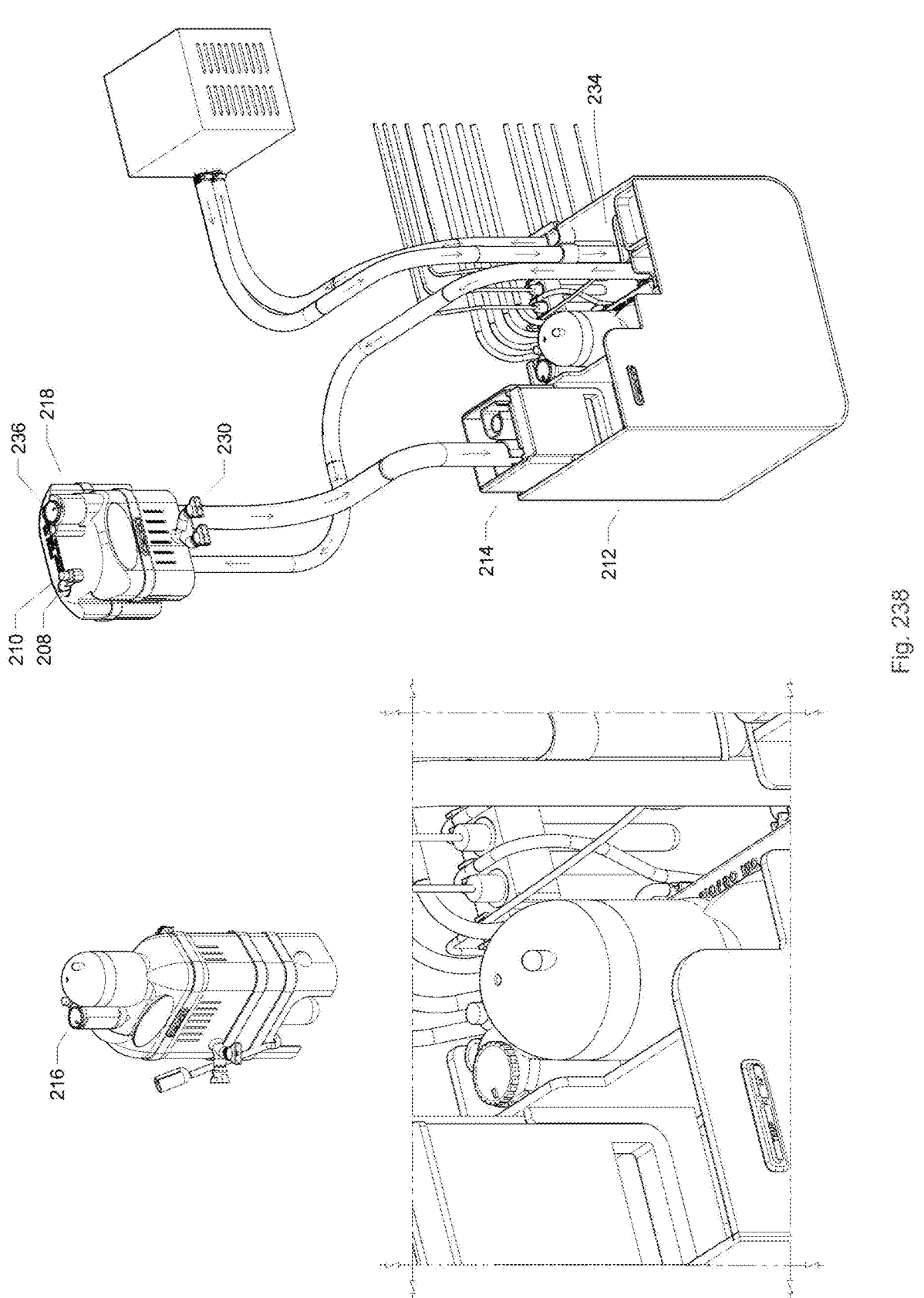

FIG. 238 depicts a reference to assorted front perspective assembly views of an optional internal FIG. 1 biologic box filter assembly w/c.o.d. AW, in an alternate configuration, and shown positioned in a FIG. 1 B.A.W.P.S. single tower sump filter system with c.o.d. and single system pump type 1 O1, and optional single over flow box filter AT, and optional chiller unit AO, from the embodiment of the present invention.

Figures 239, 240:
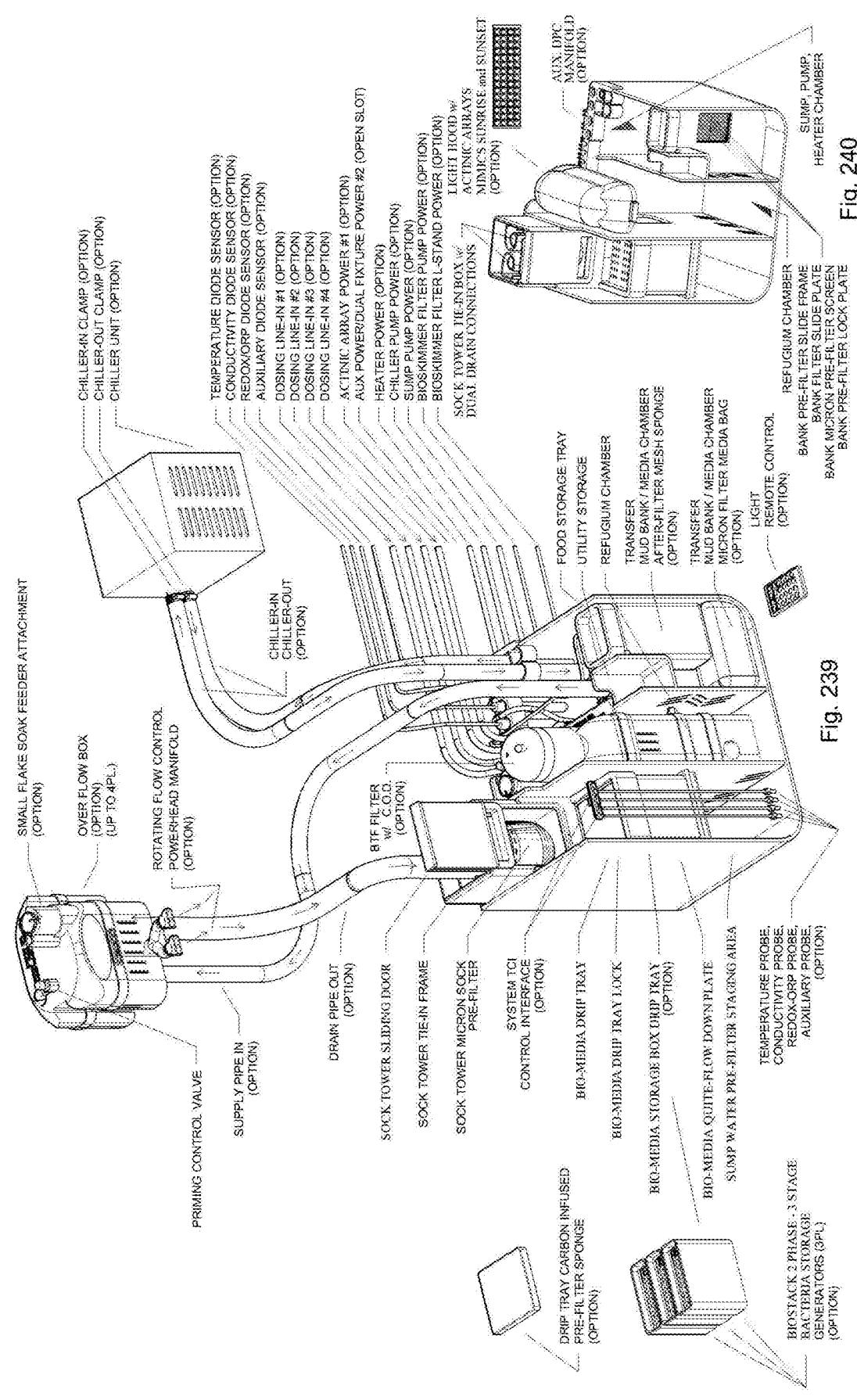

FIG. 239 depicts a reference to a front perspective assembly view of an optional internal FIG. 1 biologic box filter assembly w/c.o.d. AW, mounted in position in an alternate configuration, on a FIG. 1 B.A.W.P.S. single tower sump filter system with c.o.d. and single system pump type-1 O1, and with an optional single over flow box filter AT, and optional external sump chiller unit AO, and shown with the exterior sump front panel removed, from the embodiment of the present invention.

FIG. 240 depicts a reference to a front perspective assembly view of an optional FIG. 1 external sump LED array light fixture hood AQ, and optional FIG. 1 external sump LED array light fixture AR, in an alternate configuration, and shown mounted in position on a FIG. 1 B.A.W.P.S. single tower sump filter system with c.o.d. and single system pump type-1 O1, and with an optional single over flow box filter AT, and shown with the exterior sump front panel removed, from the embodiment of the present invention.

Figure 241:
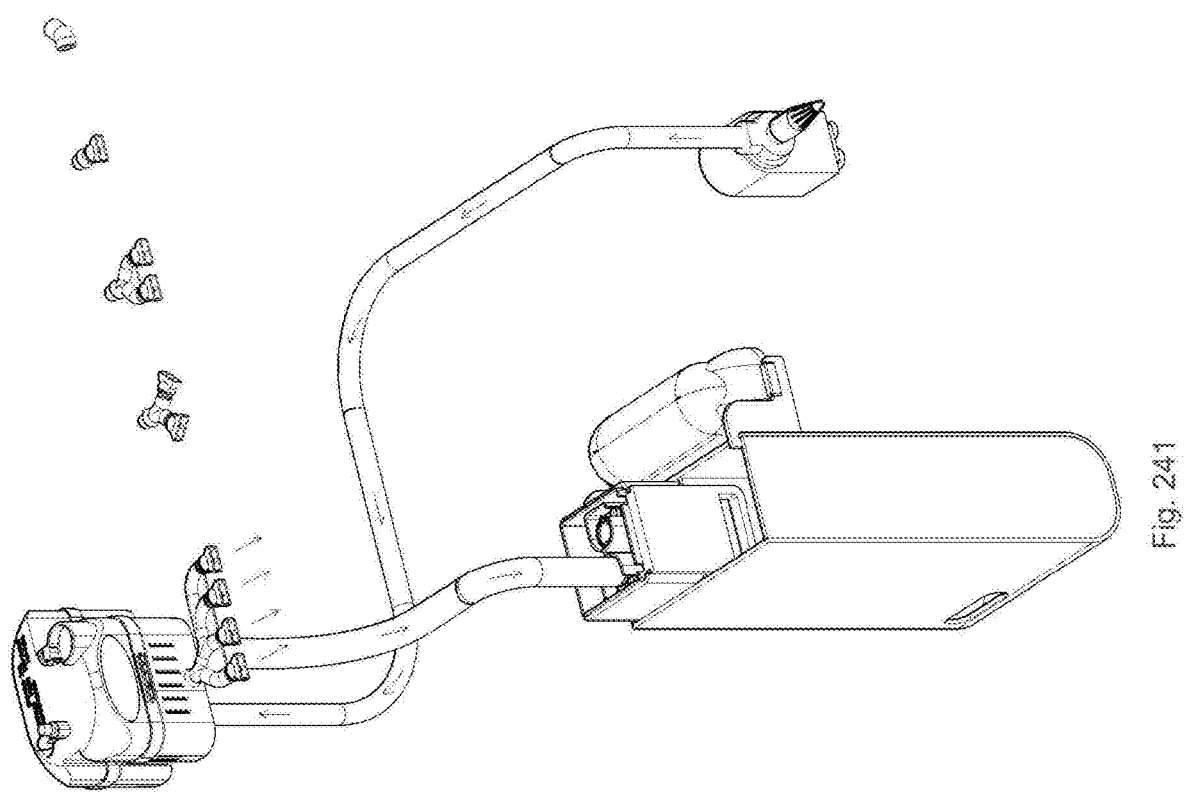

FIG. 241 depicts a reference to a front perspective assembly view of an optional FIG. 1 external sump LED array light fixture hood AQ, and optional FIG. 1 external sump LED array light fixture AR, in an alternate configuration, and shown mounted in position on a FIG. 1 B.A.W.P.S. single tower sump filter system, and with a single system pump type-1 O1, and optional single over flow box filter AT, from the embodiment of the present invention.

Figures 242, 243:
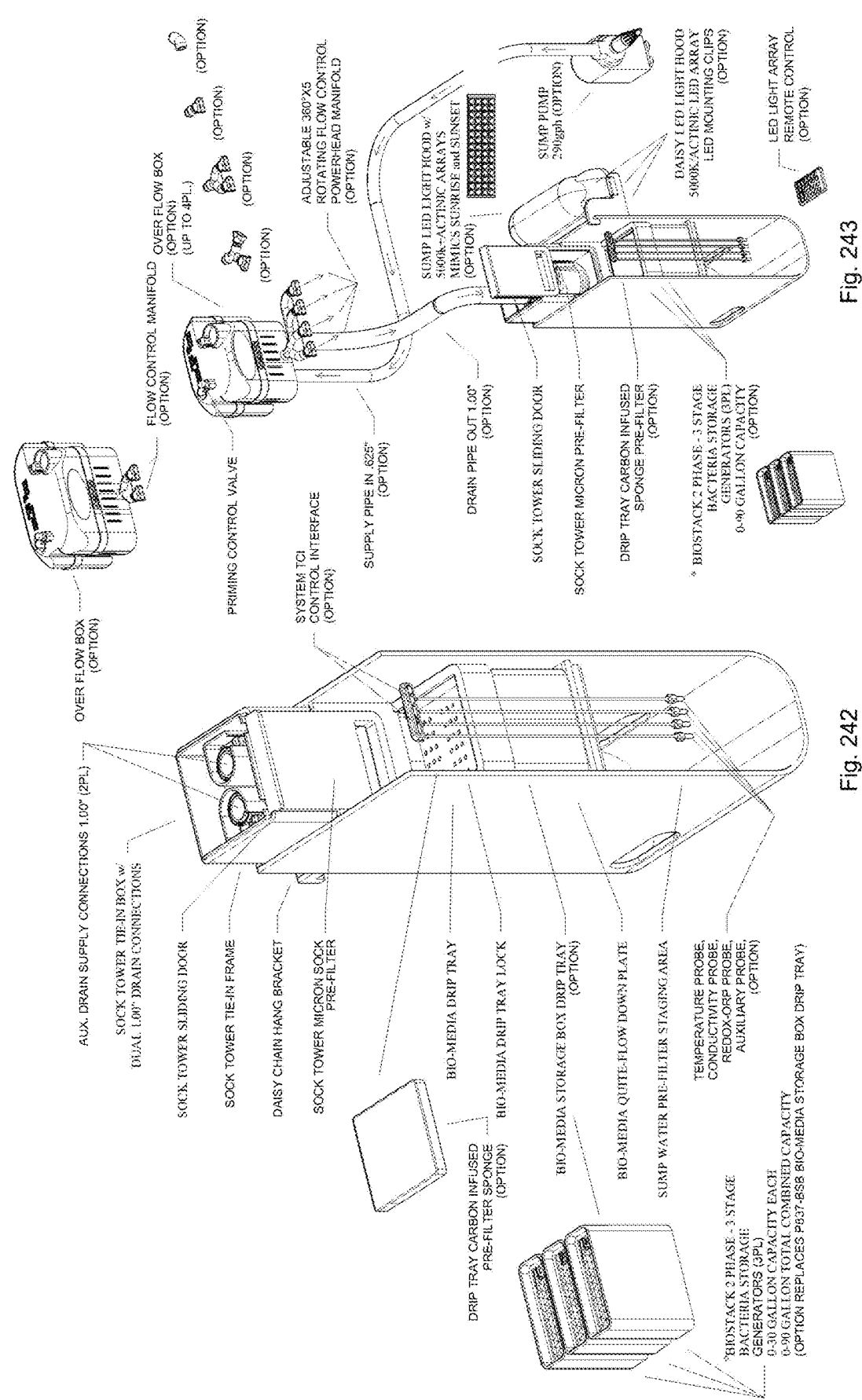

FIG. 242 depicts a reference to a front perspective assembly view of an optional alternate configuration and shown with the exterior sump front panel removed, from the embodiment of the present invention.

FIG. 243 depicts a reference to a front perspective assembly view of an optional FIG. 1 external sump LED array light fixture hood AQ, and optional FIG. 1 external sump LED array light fixture AR, in an alternate configuration, and shown positioned on a FIG. 1 B.A.W.P.S. single tower sump filter system, and with a single system pump type-1 O1, and optional single over flow box filter AT, and shown with the exterior sump front panel removed, from the embodiment of the present invention.

Figure 244:
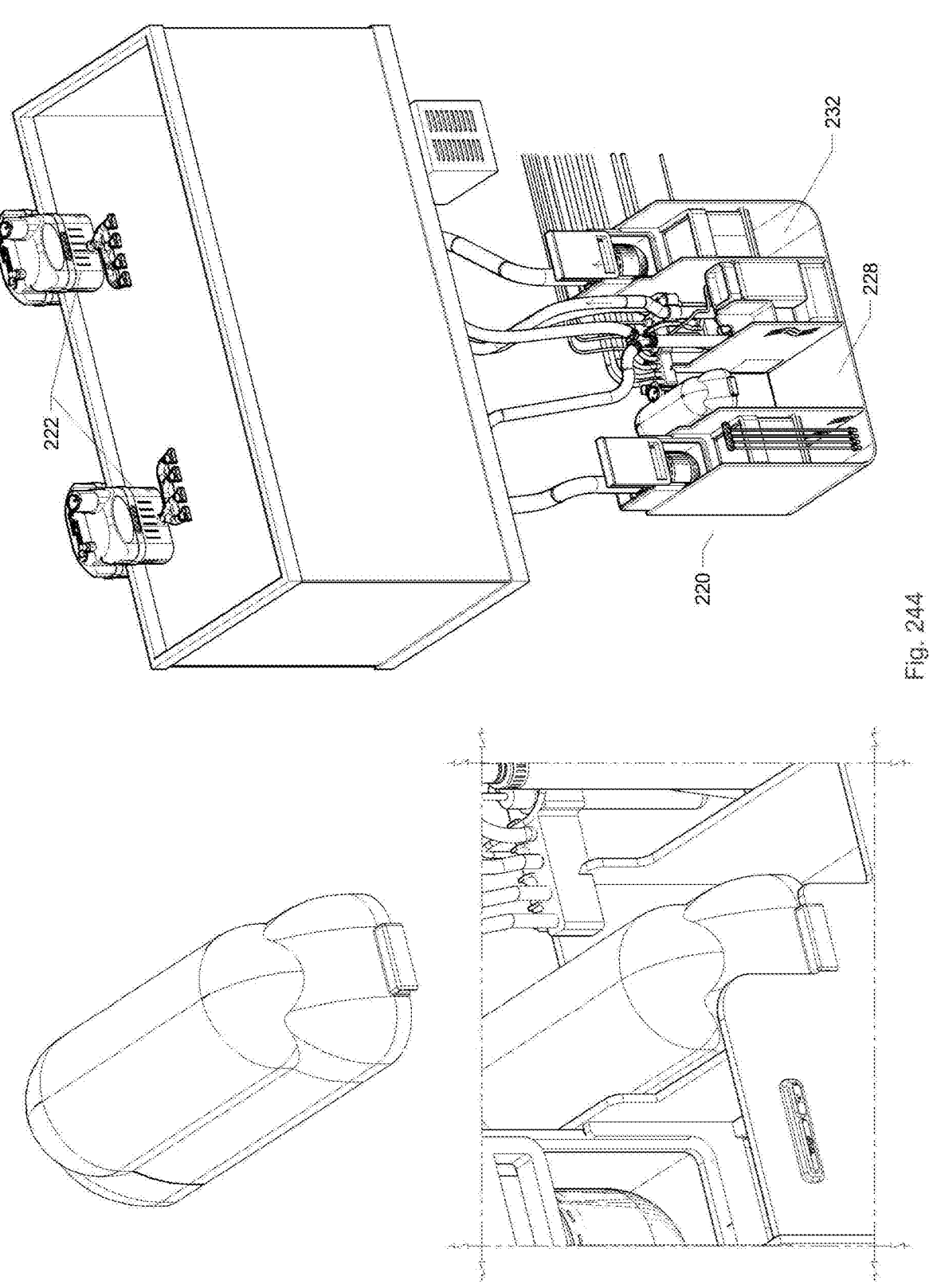

FIG. 244 depicts a reference to a front perspective assembly views of an optional FIG. 1 external sump LED array light fixture hood AQ, and optional FIG. 1 external sump LED array light fixture AR, in an alternate configuration, and shown positioned on a FIG. 1 B.A.W.P.S. dual tower sump filter system, and with a single system pump type-1 O1, and a single system pump type-2 O2, and an optional set of two over flow box filters AT, AT, and shown with the exterior sump front panel removed, from the embodiment of the present invention.

Figures 245, 246:
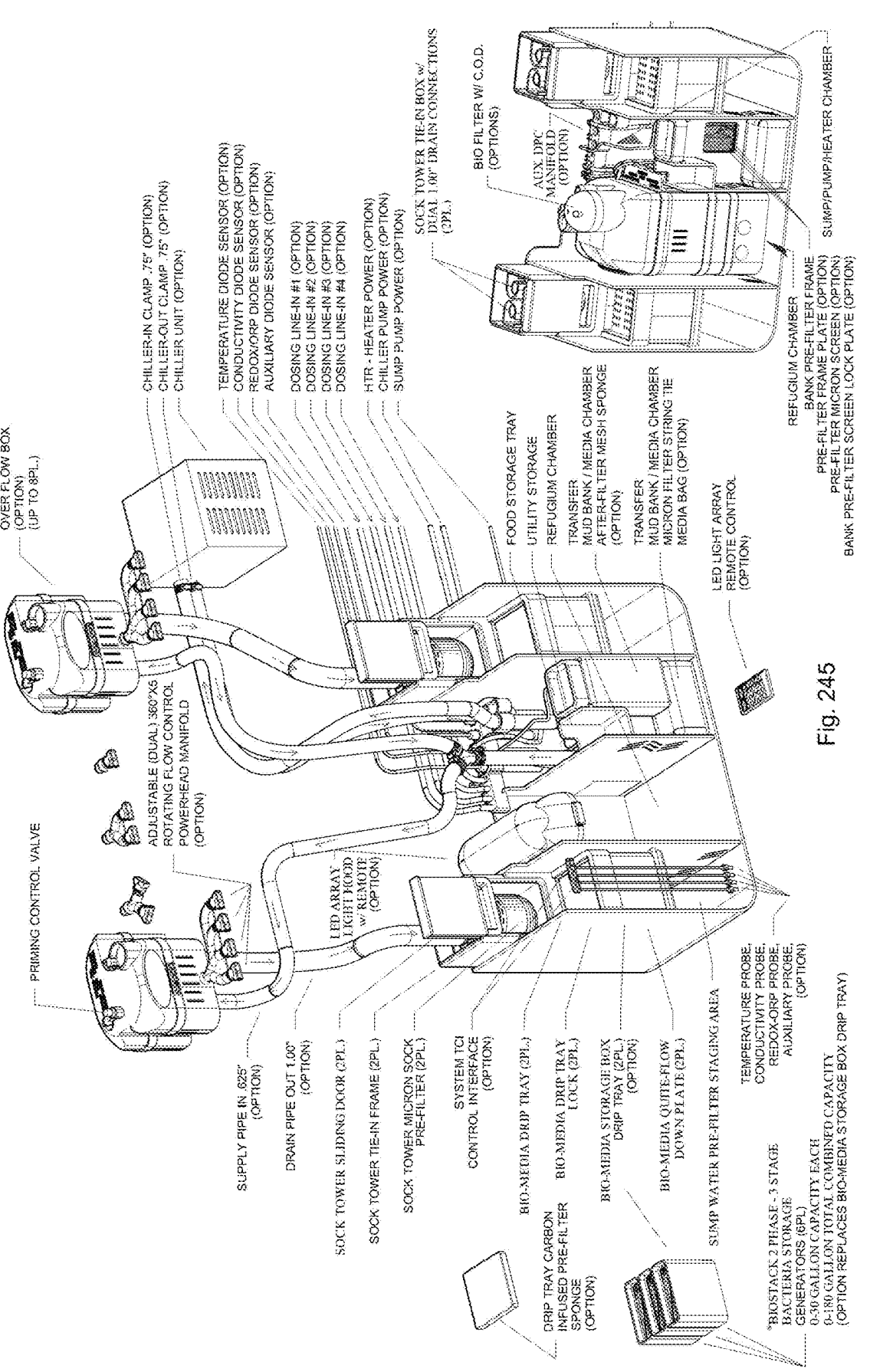

FIG. 245 depicts a reference to a front perspective assembly view of an optional FIG. 1 external sump LED array light fixture hood AQ, and optional FIG. 1 external sump LED array light fixture AR, in an alternate configuration, and shown positioned on a FIG. 1 B.A.W.P.S. dual tower sump filter system, and with a single system pump type-1 O1, and a single system pump type-2 O2, and an optional set of over flow box filters AT, AT, and shown with the exterior sump front panel removed, from the embodiment of the present invention.

FIG. 246 depicts a reference to a front perspective assembly view of an additional type of optional internal FIG. 1 biologic box filter assembly w/c.o.d. AW, mounted in position in an alternate configuration, on a FIG. 1 B.A.W.P.S. dual tower sump filter system with c.o.d. and single system pump type-1 O1, and single system pump type-2 O2, and shown with the exterior sump front panel removed, from the embodiment of the present invention.

FIG. 247 depicts a reference to a front perspective assembly views of an optional FIG. 1 external sump LED array light fixture hood AQ, and optional FIG. 1 external sump LED array light fixture AR, in an alternate configuration, and shown positioned on a FIG. 1 B.A.W.P.S. three tower sump filter system, and with a set of dual system pumps type-1 O1, 01, and a single system pump type-2 O2, and an optional set of four over flow box filters AT, AT, AT, AT, and shown with the exterior sump front panel removed, from the embodiment of the present invention.

Figures 248, 249:
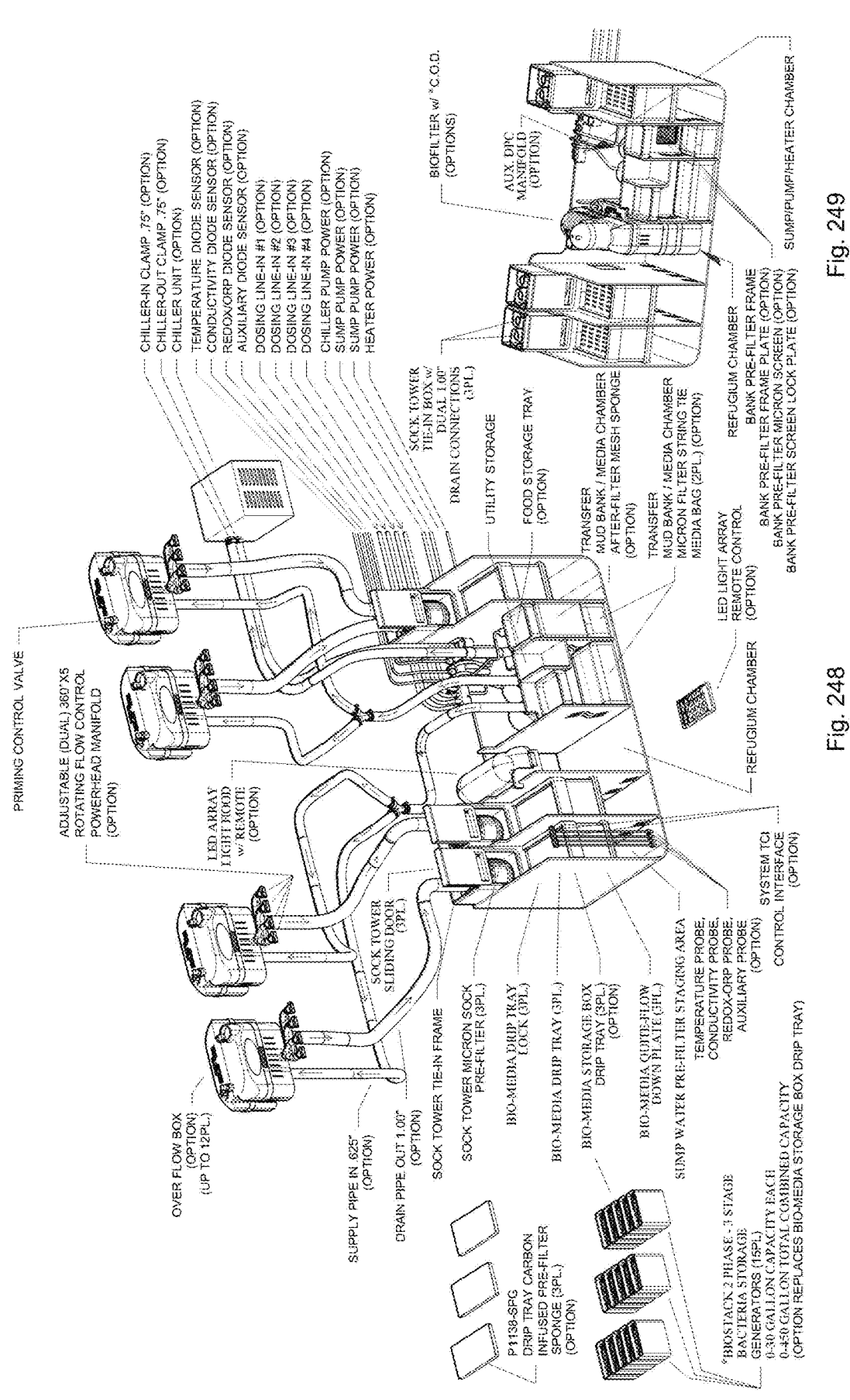

FIG. 248 depicts a reference to a front perspective assembly views of an optional FIG. 1 external sump LED array light fixture hood AQ, and optional FIG. 1 external sump LED array light fixture AR, in an alternate configuration, and shown positioned on a FIG. 1 B.A.W.P.S. three tower sump filter system, and with a set of dual system pumps type-1 O1, 01, and a single system pump type-2 O2, and an optional set of four over flow box filters AT, AT, AT, AT, and optional external sump chiller unit AO, and shown with the exterior sump front panel removed, from the embodiment of the present invention.

FIG. 249 depicts a reference to a front perspective assembly view of an additional type of optional internal FIG. 1 biologic box filter assembly w/c.o.d. AW, mounted in position in an alternate configuration, on a FIG. 1 B.A.W.P.S. three tower sump filter system with c.o.d., and set of dual system pumps type-1 O1, 01, and single system pump type-2 O2, and shown with the exterior sump front panel removed, from the embodiment of the present invention.

Figure 250:
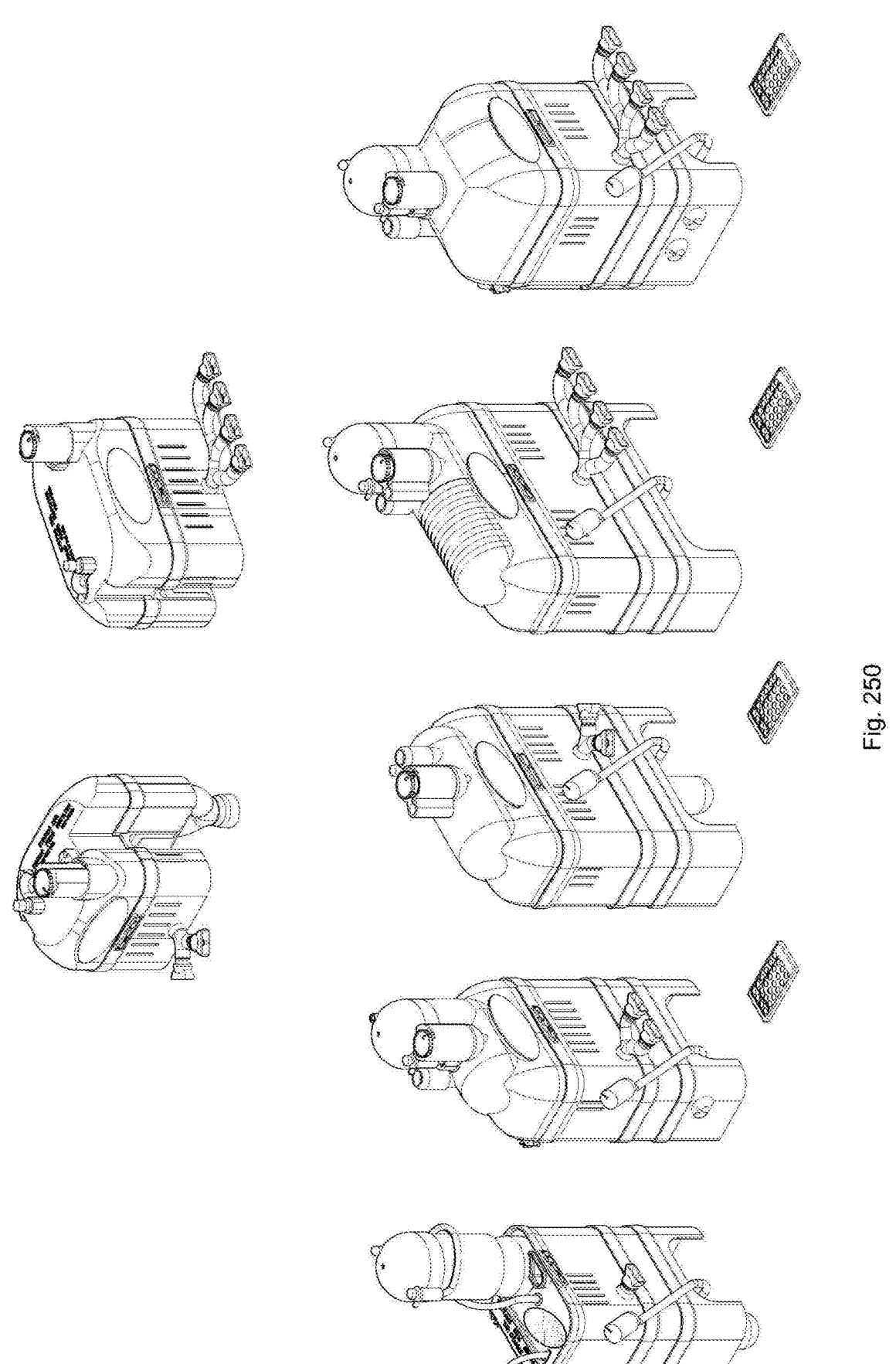

FIG. 250 depicts a reference to a front perspective assembly views of additional types of optional internal biofilters w/c.o.d. AV, AW, and external over flow box filters AT, AU, and optional external sump chiller unit AO, and shown with the exterior sump front panel removed, from the embodiment of the present invention.

DETAILED DESCRIPTION OF THE INVENTION

Referring first to all the embodiments in FIG. 1, which are made of an acrylic or plastic material, preferably red translucent in color, this with the exception of embodiments such as internal electrical parts, motors, pumps and batteries.

Referring next to configuration: before securing a single or multiple optional FIG. 226 B.A.W.P.S. high flow external over flow box filter(/s), (Separate patent application. pending Ser. No. 18/165,834), 174, 227 176, or alternate aftermarket over flow box filter assembly, in a suitable location which provides access to the main habitat area (usually at the water's edge) on a stand, bracket, or by straddling the specially designed unit over the top back wall, or the top side wall of any habitat tank, aquarium or pond edge and remove the FIG. 238 B.A.W.P.S. high flow external over flow box filter(/s) top cover 218, w/optional FIG. 238 B.A.W.P.S. high flow external over flow box filter manual or automatic fill/feeder attachment 236, 216, and set them aside. (There is also the optional FIG. 225 manual or automatic sliding soak fill/feeder tank wall clip 168, 170, 172.

Connect the supply and drain lines to the FIG. 226 B.A.W.P.S. high flow external over flow box filter(/s), (Separate patent application pending Ser. No. 18/165,834), 174, 227 176, or alternate aftermarket over flow box filter assembly, by using two tube clamps; tighten the first tube clamp in place by securing it to one end of a pipe or piece of tubing and mount it on the supply nozzle end on the FIG. 208 B.A.W.P.S. multi tower sump filter internal system pump type-1 132. Carefully twist and at the same time, push-on snugly, the other end of a pipe or piece of tubing to the unit's supply-in connection, (this is the smaller of the two connections which are located on the bottom side of the FIG. 226 B.A.W.P.S. high flow external over flow box filter(/s), (Separate patent application pending Ser. No. 18/165,834), 174, 227 176, or alternate aftermarket over flow box filter assembly, and tighten the second tube clamp in place via the screwdriver slot provided on the rear back face of the unit.

Likewise, secure the main drain line(/s) in place by using an additional tube clamp to secure one end of a pipe or piece of tubing atop the FIG. 216 B.A.W.P.S. multi tower sump filter system drain tie-in box(/s) 150, and then carefully twist, and push-on snugly, the other end to the first of two larger connections which are located on the bottom side of the to the FIG. 226 B.A.W.P.S. high flow external over flow box filter(/s), (Separate patent application. pending Ser. No. 18/165,834), 174, 227 176, or alternate aftermarket over flow box filter assembly, (these connections are specifically designed to be press fit only), no pipe clamp is required for this type of connection.

Having two drain connections at this location on the FIG. 226 B.A.W.P.S. high flow external over flow box filter(/s), (Separate patent application pending Ser. No. 18/165,834), 174, 227 176, for the unit's expansion to additional dual drainage if needed, it also creates a "redundancy" type of framework for future use with a multi-sock-tower configuration that will protect the system's main habitat chamber area from ever overfilling should any single drain fail during use FIG. 239, 241, 245, 248.

Now, with the supply line and main drain line connections securely in place, lower the FIG. 226 B.A.W.P.S. high flow external over flow box filter(/s), (Separate patent application pending Ser. No. 18/165,834), 174, 227 176, or alternate aftermarket over flow box filter assembly, into place so that it/they sits levelly on both the inside and the outside of the habitat chamber area, (front inflow slots should automatically reside seventy percent submerged within the habitat's upper water column while the unit faces forward so that the inflow skimmed surface water of the habitat area can then enter the unit freely and initial water processing can begin to take place).

Prime the system: with the FIG. 238 BAWPS over flow box filter top cover 218 still removed, plug in and switch on the FIG. 208 B.A.W.P.S. multi tower sump filter internal system pump type-1 132. Use two fingers to pull out the FIG. 238 BAWPS over flow box filter air-control valve tubing 208, that is located atop the FIG. 238 BAWPS over flow box filter bottom housing 208, and turn the FIG. 238 BAWPS over flow box filter bottom housing air-control valve knob 210, which controls the air-flow in, counter-clockwise, to open it up completely so that it is no longer seated. Next, attach the free end of the airline to a palm-siphon-primer-bulb or between your lips and draw-in air to make sure that the air flow in the tube is not obstructed and remains completely free to travel from the FIG. 238 BAWPS over flow box filter bottom housing air-control valve knob 210, to the end of the airline attached to the palm-siphon-primer-bulb or tube end at your lips.

Use a cup or small container to transfer a needed amount of habitat chamber system water into the rear drain chamber of the FIG. 238 BAWPS over flow box filter bottom housing 208, (this is the side with the two drain connections visible), once the water level rises past the rear drain box's main drain-lip, and then begins to overflow into the main drain-pipe, start to draw in air from the FIG. 238 BAWPS over flow box filter air-control valve tubing 208, do this steadily until the over the wall pipe-chase is filled with water entirely, this will be evident when a solid stream of water appears at the beginning of the FIG. 238 BAWPS over flow box filter air-control valve tubing 208, near the FIG. 238 BAWPS over flow box filter air-control valve, 210. Once a solid stream of water is evident at the beginning of the FIG. 238 BAWPS over flow box filter air-control valve tubing 208, close the FIG. 238 BAWPS over flow box filter air-control valve 210, by turning it clockwise until it is fully seated and no more water can be drawn into the FIG. 238 BAWPS over flow box filter air-control valve tubing 208.

Return the FIG. 238 BAWPS over flow box filter air-control valve tubing 208 back to its original position within the open area in the rear of the unit. Now that the FIG. 226 B.A.W.P.S. high flow external over flow box filter(/s), (Separate patent application pending Ser. No. 18/165,834), 174, 227 176, or alternate aftermarket over flow box filter assembly, is primed, full system running, use the tip of your finger around all external connections and inspect them for seeps or leakage.

Verify that the water is flowing unhindered from the main habitat area, tank, pond or aquarium, and into the front slots of the FIG. 226 B.A.W.P.S. high flow external over flow box filter(/s), (Separate patent application pending Ser. No. 18/165,834), 174, 227 176, or alternate aftermarket over flow box filter assembly. Follow the waters path beyond the over the wall pipe-chase and down into the over flow box filter drain, and then finally reaching the FIG. 238 B.A.W.P.S. multi tower sump filter w/c.o.d. 212, via the FIG. 216 B.A.W.P.S. multi tower sump filter system drain tie-in box(/s) 150, 238 214.

Once you have verified that the system is running correctly, wait one minute and loosen the FIG. 238 BAWPS over flow box filter air-control valve 210 once more, draw in once again on the end of the FIG. 238 BAWPS over flow box filter air-control valve tubing 208, and confirm that no oxygen bubbles have gathered or formed within the FIG. 226 B.A.W.P.S. high flow external over flow box filter(/s), (Separate patent application pending Ser. No. 18/165,834), 174, 227 176, or alternate aftermarket over flow box filter system's over the wall pipe. If no air bubbles appear in the FIG. 238 BAWPS over flow box filter air-control valve tubing 208, then return the FIG. 238 BAWPS over flow box filter air-control valve 210, to its closed and seated position and replace the FIG. 238 B.A.W.P.S. high flow external over flow box filter(/s) top cover w/manual or electronic fill/feeder attachment 218, so that the FIG. 238 BAWPS over flow box filter air-control valve 210, and FIG. 238 BAWPS over flow box filter air-control valve tubing 208, are easily accessible from outside the FIG. 238 B.A.W.P.S. high flow external over flow box filter(/s) top cover w/manual or electronic fill/feeder attachment via the slot provided through it's now closed top cover 218.

Congratulations, the system is now up and running, periodically check to see if any oxygen has accumulated in the aftermarket over the wall pipe-chase by using the above priming test procedure, use the FIG. 238 BAWPS over flow box filter air-control valve 210, and FIG. 238 BAWPS over flow box filter air-control valve tubing 208, to (bleed) or remove any oxygen in the system if it is ever present.

The FIG. 238 B.A.W.P.S. multi tower sump filter w/c.o.d. 212, is designed to automatically "self prime" and then restart again by itself (without manual priming or bleeding) should the FIG. 208 B.A.W.P.S. multi tower sump filter internal system pump type-1 132, fail for any reason or if power to the pump should go off and later turn back on.

If for some reason the FIG. 226 B.A.W.P.S. high flow external over flow box filter(/s), (Separate patent application. pending Ser. No. 18/165,834), 174, 227 176, or alternate aftermarket over flow box filter should get clogged by debris or stop flowing, it is suggested that two or more FIG. 226 B.A.W.P.S. high flow external over flow box filter(/s), (Separate patent application pending Ser. No. 18/165,834), 174, 227 176, or alternate aftermarket over flow box filter be used in tandem (at more than one location) FIG. 244 220, 222, to create a "redundant" type of system, (if one of the overflow boxes fail, the other should provide sufficient drainage until the failure of the first unit can be addressed). Here we would like to note that pump-head flow which enters the system at habitat area elevation should not exceed eighty percent of a single unit's full dual-drain capacity.

After being continuously skimmed, the unfiltered water from the main habitat area travels via the FIG. 226 B.A.W.P.S. high flow external over flow box filter(/s), (Separate patent application pending Ser. No. 18/165,834), 174, 227 176, or alternate aftermarket over flow box filter(/s) front slot openings FIG. 244 222, and into the front of the overflow box itself where it is siphoned over the over the wall pipe-chase tube wall construction, and then through to the aftermarket main return drain(s) which are located on the bottom rear side of the unit before final draining.

The FIG. 226 B.A.W.P.S. high flow external over flow box filter, (Separate patent application pending Ser. No. 18/165,834), 174, 227 176, is capable of non-stop surface skimming which in turn removes all contaminants from the top layers of the habitat chamber area's water column before then transferring that used water to the FIG. 238 sump interior sock tower assembly 214, which consists of FIG. 210 sump interior sock tower frame rails 136, FIG. 212 sump interior sock tower frame 140, and FIG. 213 sump interior sock tower frame slide 142, and FIG. 214 sump interior sock tower frame sliding door 144, and also FIG. 215 sump interior sock tower frame micron mesh pre-filter sock ring 146, and FIG. 215 micron mesh pre-filter sock 148, and FIG. 216 sump interior sock tower frame drain tie-in box 150, for processing and revitalization.

The FIG. 238 B.A.W.P.S. multi tower sump filter w/c.o.d. 212, prevents the normal buildup of harmful contaminants such as algae blooms, nitrates, nitrites, PH imbalances, detritus and biological waste that regularly accumulate in the habitat area and often offset the short term stability of the water quality in the entire system, this aquatic load frequently makes the habitat containment area itself detrimental to the plants and animals that reside in, on or around it.

Once the un-filtered water passes into the intake tower of the FIG. 238 sump interior sock tower assembly/(s) 214, the unfiltered water is then coursed through the FIG. 215 sump interior sock tower frame micron mesh pre-filter sock ring and micron mesh pre-filter sock/(s) 146. This process incorporates mechanical filtration as a method of water purification.

Here, there is a FIG. 214 sump interior sock tower frame sliding door 144, a removable sliding door that is located at the FIG. 238 sump interior sock tower assembly/(s) 214 front, which when removed or raised, allows for the aquaculturist to have full access to the FIG. 215 sump interior sock tower frame micron mesh pre-filter sock ring and micron mesh pre-filter sock/(s) 146, for their removal, rinsing and/or replacement.

Now prefiltered, the water flows out through the FIG. 238 sump interior sock tower assembly/(s) 214, and FIG. 211 sump interior sock tower door stop/(s) 138, and passes under the FIG. 223 sump interior bio media storage generator drip tray splash guard lock plate 164, before it then enters the holding area provided atop the FIG. 221 sump interior bio media storage generator drip tray 160. (An optional FIG. 222 sump interior bio media storage generator drip tray pre-filter carbon infused sponge 162, can be placed here and can add additional chemical filtration to the system.)

When accumulated in the fronts FIG. 221 sump interior bio media storage generator drip tray 160, the prefiltered water quickly begins gravity dripping through its array of tapered dispersion holes which creates a continuous trickle effect upon the top surface of the bio-weave of the FIG. 220 sump interior bio stack two stage/three-phase bacteria storage generators 158, 130 224, inner tubular mesh 132 226, or any alternate media being stored in the optional FIG. 219 bio media storage generator drip tray box 156.

During saturation, the upper levels of the inner tubular mesh on the FIG. 220 sump interior bio stack two stage/three-phase bacteria storage generators 158, 130 224, immediately begins to convert any animal or plant load within its air/water mix saturation column into a slowly growing air/water type bacteria culture which remains in place and grows as it adheres to every surface of the FIG. 220 sump interior bio stack two stage/three-phase bacteria storage generators 158, 130 224, inner upper, tubular mesh walls 132 226.

Here, in this area, the bacteria culture begins to balance and offset the overall system waste load, (more load, more bacteria—less load, less bacteria), and the bacteria culture continues to accumulate and grow as it feeds on the its increased waste load from the introduction of additional inhabitants. This process incorporates biological filtration as a method of water purification.

After traversing through the FIG. 220 sump interior bio stack two stage/three-phase bacteria storage generators' 158, 130 224, upper levels, the lower levels of the FIG. 220 sump interior bio stack two stage/three-phase bacteria storage generators 158, 130 224, inner lower, tubular mesh walls 132 226, becomes saturated with water and begins to retain, though in a gravity suspension submersion state (or soaking) environment, an additional batch of living bacteria culture which stays fully cloaked and submerged in water all of the time during the cycling process.

This type of living bacteria unlike the first, doesn't thrive as well in an air/water mixed environment but instead, it may be referred to as an under-gravel type-based bacteria. This new bacteria culture then converts any animal or plant waste or load within its own solid water column of inner tubular mesh into additional submerged water-based bacteria cultures which then also grow and feed on the leftovers of any waste load that has not yet been consumed by the upper level's air/water cultured bacteria, (again the living culture base will expand and contract to match the current load requirements). This process also incorporates biological filtration as a method of water purification. Hence, the (BAWPS)—Biologic Aquatic Water Purification System with over flow box filters, bioskimmer, and c.o.d. was created.

Since these types of bacteria cultures naturally build up and accrue on bacteria storage surface layers over time, a standard quantity of bio-balls or sponge-like media substrate or "block" which is normally held stationary (as to not cause the bacteria to let free itself from the biomass substrate or surfaces that it has bonded to and contaminate the entire system) and stored within a single chamber/sump, it will eventually deplete its own effectiveness and efficiency over an extended period of time, (usually six months to a year). At this point, most systems that exist on the market will require for the biologic material to be removed, replaced and/or, all its adhesion surfaces cleaned.

Unfortunately, this "cycling" affect or "bacteria build time" requires months to take place. Once established, currently designed biologic filter systems do not allow for the aquaculturist to touch, move or even clean in any way these accumulated and cultured biomass surfaces after the initial live bacteria load cultivation process has begun.

After a time, these types of generic systems that utilize more primitive forms of biological filtration will eventually, and often do in fact, collapse under their own bacteria load. And shortly thereafter, if the older created or already existing dead and dying biomass bacteria cultures which are older and located under the newer top living layers of bacteria have not been removed, the water quality in the main habitat containment area will be forced into a "spiked" or "heavy load" state which will stress and often kill all of the inhabitants which are exposed to it.

Therefore, it is for this reason that the FIG. 238 B.A.W.P.S. multi tower sump filter w/c.o.d. 212, comes with three FIG. 220 sump interior bio stack two stage/three-phase bacteria storage generators 158, 130 224, already installed in place.

Sets of three or more of the FIG. 220 sump interior bio stack two stage/three-phase bacteria storage generators 158, 130 224, makes it possible for the aquaculturist to now remove one of the FIG. 220 sump interior bio stack two stage/three-phase bacteria storage generators 158, 130 224, at a timed interval (every three months) and then clean it (heavy rinsing), or replace it, before then re-inserting it back into its original position within the FIG. 238 B.A.W.P.S. multi tower sump filter w/c.o.d. 212, filter system.

This process of continuously rotating and cleaning the FIG. 220 sump interior bio stack two stage/three-phase bacteria storage generators 158, 130 224, assures that no individual section of the trapped biomass culture ever grows old or becomes fully cycled, nor does it have a chance to accumulate too many of the consecutive surface layers of decaying biological buildup over time which will cause a major decline in the overall system's water quality.

Amazingly, FIG. 238 B.A.W.P.S. multi tower sump filter w/c.o.d. 212, system is the first and only processing system on the market that offers the aquaculturist the ability to not spend time "cycling" their systems during initial set up.

The FIG. 238 B.A.W.P.S. multi tower sump filter w/c.o.d. 212, prevents any spike load from occurring in the first place. From the moment it is turned on, there is no longer the need to purchase or add costly add-on products for "cycling" to the system and then waiting a nail biting full month to see if your newly arrived prized first fish survives.

This type of filtration is considered state of the art and systems with c.o.d. are completely "cycle-less" which is something that up to this point has been entirely unavailable to any consumer. An aquaculturist can now add as many additional plants and animals as he or she likes to the habitat area on day one, and their additional load will be compensated for by the bioskimmer, biostack, and c.o.d. system until initial bacteria load "cycle" is achieved.

Arriving past the FIG. 220 sump interior bio stack two stage/three-phase bacteria storage generators 158, 130 224, the freshly prefiltered, c.o.d. injected, and biologically processed water can then pass down through FIG. 218 bio media storage drain support plate 154, and along FIG. 217 bio media storage drain box quite flow down plate 152, before then passing through the lower wall slots of FIG. 200 sump interior panel refugium separation C 106, and into the refugium chamber where here, live animals and plants can be placed for exposure to a lighting schedule which should be timed completely opposite to that of the main habitat chamber area via the optional FIG. 228 optional internal tower sump biologic trapping filter w/c.o.d. 180, 229 182, (Separate patent application pending Ser. No. _____), internal light FIG. 229 186 or with the FIG. 236 sump exterior light fixture remote control 200, and FIG. 236 sump exterior light fixture LED array 202, and FIG. 237 sump exterior light fixture hood 204.

By running opposite lighting on the FIG. 238 B.A.W.P.S. multi tower sump filter w/c.o.d. 212, live plant refugium chamber 244 228, positioned midway in the FIG. 198 main sump filter assembly 102, 199 104, 200 106, 201 108, 202 110, the aquaculturist can produce a separate day time simulated carbon monoxide consumption filtering period within the refugium chamber, (a period during the daytime in which the plants in the refugium are subjected to darkness and absorb the harmful carbon dioxide being released during the daytime hours by the inhabitants of the main living aquatic area). This process incorporates photosynthesis as a method of water purification.

In this refugium chamber area, there is also suitable mounting space on FIG. 200 sump interior panel refugium separation 106, 244 228, for an optional expansion filter such as the FIG. 228 optional internal tower sump biologic trapping filter w/c.o.d. 180, 229 182, and its high flow biologic protein remover 228 180. (Separate patent app. pending Ser. No. _____).

The FIG. 228 optional internal tower sump biologic trapping filter w/c.o.d. 180, 229 182, incorporates a three stage flow system which incorporates (venturi oxygen injection, adjustable manifold power heads, and c.o.d. or "compressed oxygen diffusion).

After leaving from the FIG. 228 optional internal tower sump biologic trapping filter w/c.o.d. 180, 229 182, (Separate patent application pending Ser. No. _____), and its own high flow biologic protein bioskimmer via it's adjustable FIG. 229 optional front power-head manifold 184, 238 230, the newly biologically filtered, bio-skimmed and polished water returns to the main refugium area where it travels through a set of additional wall slots which are located high on FIG. 201 sump interior panel pump chamber separation 108. Here, the flow is compressed through FIG. 206 sump interior mud bank media pre-filter sponge 128, (removable), located just under FIG. 205 sump interior auxiliary food storage tray bridge 126, FIG. 204 sump interior food storage tray rails 120, 122, and FIG. 204 sump interior food storage tray 124, and where after passing, the flow then runs through the micron mesh of the bank filter slide frame pre-filter assembly which includes FIG. 203 sump interior bank filter slide frame 112, and FIG. 203 sump interior bank filter slide frame plate 114, and FIG. 203 sump interior bank filter slide frame pre-filter screen 116, and FIG. 203 sump interior bank filter slide frame pre-filter screen lock plate 118. The water accumulates here in this area of the main chiller, sump, and pump chamber (extended multi sock tower models are shown on FIG. 244, 247, and include FIG. 244 crushed coral/mud bank soak chamber 232, where additional biological bacteria types can be cultivated by using assorted substrates such as gravel, crushed coral, sand and mud) for separation and treatment. These processes incorporate the use of chemical, mechanical and biological filtration as methods for water purification.

Upon arriving in the main FIG. 238 chiller, sump, pump chamber 234, where the fully processed water can now be treated and dosed with as many as four different additives at once, (four separate doser tube supply connections provided), all while simultaneously using FIG. 224 sump rail DPC doser, probe, chiller manifold/harness clip-on 166.

At this location, the water can also be chilled or heated as desired with the use of an optional FIG. 235 sump interior system heater 196, or external FIG. 234 sump exterior system chiller unit 194, with an optional FIG. 230 sump rail DPC doser, probe, chiller manifold/harness drop pipe 186. Here, instrument probing for specific particle levels FIG. 231 sump interior system probes w/insulators 190, 232 192, can be used to track all system water quality levels such as temperature, redox-orp, conductivity, and calcium levels via their access through FIG. 224 sump rail DPC doser, probe, chiller manifold/harness clip-on 166. There is also the optional FIG. 233 sump interior TCI thermostatic control interface 192, which has its own built-in thermometer and a complete set of diodes and probes which can grant the aquarist with a digital display of pertinent real time information regarding the current status of their existing water conditions.

With this part of the journey at completion, the old habitat water now mechanically micron screened, biologically sifted, bioSkimmed of unwanted proteins, c.o.d. infused and oxygenated, chemically carbon filtered, treated with additives, and probed for proper particle levels as well as heated or cooled to desired temperatures and thus fully processed, the newly B.A.W.P.S. purified system water is then pumped via the FIG. 209 B.A.W.P.S. multi tower sump filter internal system pump type-2 134, through the optional FIG. 234 sump exterior system chiller unit 194, and back again.

Next, all the system water circulating gets pumped by FIG. 208 B.A.W.P.S. multi tower sump filter internal system pump type-1 132, and out of FIG. 238 chiller, sump, pump chamber 234, and back up into the FIG. 226 B.A.W.P.S. high flow external over flow box filter(/s), (Separate patent app. pending Ser. No. 18/165,834), 174, 227 176, or alternate aftermarket over flow box filter, where the flow is redirected back over the over the wall pipe-chase tube wall construction and then through to the FIG. 227 main return powerhead assembly with adjustable nozzle heads 178, which is located on the front face of the FIG. 226 B.A.W.P.S. high flow external over flow box filter(/s).

Now, as fast as the FIG. 208 B.A.W.P.S. multi tower sump filter internal system pump type-1 132, pumps water into the aftermarket habitat area, it will be continuously siphoned away at that same rate as it arrives and then transferred into the FIG. 226 B.A.W.P.S. high flow external over flow box filter(/s), (Separate patent application pending Ser. No. 18/165,834), 174, 227 176, or alternate aftermarket over flow box filter, to be recirculated again and again down through the FIG. 238 B.A.W.P.S. multi tower sump filter w/c.o.d. 212, for reprocessing before once more being returned.

The (BAWPS)—biologic aquatic water purification system process continues twenty-four, seven, and builds the strongest most stable and controllable "cycle for life" that is available to aquatic plant and animal aquaculturists today. Sturdy and well built, the cycleless FIG. 238 B.A.W.P.S. multi tower sump filter w/c.o.d. 212, will run quietly and efficiently in the background while providing all levels of aquaculturists with the peace of mind they deserve.

The invention claimed is:

1. A tower sump filter system for transferring water from a pond, stream, tank, or main tank/habitat chamber to an external filter system for processing water and returning the processed water back through the same tower sump filter system comprising: a cycleless biological aquatic water purification system (B.A.W.P.S.) with continuous oxygen diffusion (C.O.D.) injection; a bioskimmer configured to provide purification and circulation of water externally from the pond, stream, tank, or main tank/habitat chamber; wherein the tower sump filter system is adaptable for use as a freestanding unit or can be mounted and integrated onto an existing tank or tank rim; wherein the tower sump filter system features semi-translucent or translucent walls, enabling visibility of its internal operations; wherein it further comprises an internal drain tie-in sump tower or sump tower connection configured for external tie-in to an overflow box filter or other external components to facilitate water transfer between the tower sump filter system and a separate tank, pond, aquarium, or habitat containment area; wherein the overflow box filter includes top surface skimming slots on the main tank/habitat chamber side to enable continuous intake of water at the rate supplied by an external filter pump, preventing overfill of the main tank/habitat chamber; wherein water flow entering through the top surface skimming slots is transferred to the tower sump filter system; wherein siphoned water flow passes over an over-the-wall pipe chase tube wall and is returned to the external filter system via drains in the lower rear portion of the overflow box filter positioned on the outside face of a tank rim, edge, or lip; wherein the drain tie-in sump tower or sump tower connection is plumbed to receive water flow from the overflow box filter or other externals and directs it to a pre-filter sock and sock-ring combination.

2. The tower sump filter system of claim 1, further comprising: an internal tower sump wet/dry trickle filter system configured to receive water flow from the drain tie-in sump tower or sump tower connection for external tie-in to an overflow box filter or other externals, and to transfer the water flow to a bio media storage generator driptray; wherein the bio media storage generator drip tray is capable of holding a carbon-infused pre-filter sponge, providing mechanical and chemical filtration; wherein the bio media storage generator drip tray dispenses collected water flow evenly over a selected bio media substrate stored in the drip tray box, which can accommodate aftermarket bio media types for bacteria cultivation, or a bio stack two-stage, three-phase bio media storage generator for bacteria cultivation, adding biological filtration; wherein the bio stack two-stage, three-phase bio media storage generator features a tubular weave construction for storing bio media in a wet and dry atmosphere during system operation and bacteria cultivation, providing biological filtration; wherein the wet/dry trickle filter system with bio stack two-stage, three-phase bio media storage generators allows for sequential removal, cleaning, and rotation to achieve a cycleless effect.

3. The tower sump filter system of claim 1, further comprising: an internal tower sump thermostatic control interface (TCI) controller interface configured to operate in conjunction with internal tower sump sensors and probes to provide a thermostatic control interface (TCI) display readout of water conditions in the main tank/habitat chamber containment area.

4. The tower sump filter system of claim 1, further comprising: an internal sump auxiliary doser, probe, chiller manifold, and harness configured to organize and secure power cables, air lines, dosing lines, and thermostatic control interface (TCI) probes and sensors.

5. The tower sump filter system of claim 1, further comprising: an internal tower sump biologic trapping filter with C.O.D. injection and a biologic protein bioskimmer, or an alternate filter unit and protein skimmer with skimbob assembly, providing mechanical, biological, and chemical filtration; wherein the biologic trapping filter with C.O.D. injection enables compressed oxygen diffusion for introducing oxygen bubbles into the aquatic environment, integrating the habitat chamber into the filtration system and achieving a cycleless, spike-free operation; wherein the biologic trapping filter includes a top surface skimbob feature to bypass top surface skim slots during evaporation periods, preventing the sump pump from running dry and overheating.

6. The tower sump filter system of claim 1, further comprising: an internal sump light fixture configured to provide light to the tower sump filter system or an internal sump refugium chamber; wherein the internal sump light fixture operates on a lighting schedule opposite to that of the habitat chamber, adding photosynthesis filtration.

7. The tower sump filter system of claim 1, further comprising: an internal sump auxiliary food storage tray configured to securely hold tools or food containers in a dry and accessible manner.

8. The tower sump filter system of claim 1, further comprising: an internal sump mud bank chamber configured for alternate bio mass generation and collection, holding a micron pre-filter tie bag for storage of mud, crushed coral, or other bio mass collection substrates in a submerged environment, and a pre-filter sponge, providing mechanical and biological filtration.

9. The tower sump filter system of claim 1, further comprising: an internal tower sump refugium chamber configured to receive water flow after it passes the wet/dry trickle filter system with bio stack two-stage, three-phase bio media storage generators and the mud bank chamber with micron pre-filter tie bag system; wherein the refugium chamber filters water via added plants before it reaches the main system sump pump and is returned to the main habitat chamber, adding photosynthesis filtration.

\* \* \* \* \*